United States Patent [19]

Wilson

[11] Patent Number: 5,268,856
[45] Date of Patent: Dec. 7, 1993

[54] BIT SERIAL FLOATING POINT PARALLEL PROCESSING SYSTEM AND METHOD

[75] Inventor: Stephen S. Wilson, Ann Arbor, Mich.

[73] Assignee: Applied Intelligent Systems, Inc., Ann Arbor, Mich.

[21] Appl. No.: 951,930

[22] Filed: Sep. 25, 1992

Related U.S. Application Data

[63] Continuation of Ser. No. 203,408, Jun. 6, 1988, abandoned.

[51] Int. Cl.[5] ............................................. G06F 7/38
[52] U.S. Cl. ...................................... 364/748; 364/736
[58] Field of Search ............................... 364/748, 736

[56] References Cited

U.S. PATENT DOCUMENTS

| | | | |
|---|---|---|---|
| 4,546,428 | 10/1985 | Morton | 364/200 |
| 4,612,626 | 9/1986 | Beauchamp et al. | 364/748 |
| 4,763,294 | 8/1988 | Fong | 364/748 |
| 4,780,842 | 10/1988 | Morton et al. | 364/748 |
| 4,858,163 | 8/1989 | Boreland | 364/715.03 |
| 4,866,651 | 9/1989 | Bleher et al. | 364/748 |
| 4,872,133 | 10/1989 | Leeland | 364/748 |

OTHER PUBLICATIONS

*Parallel-Processing Concepts Finally Come Together In Real Systems,* Computer Design, Jun. 1, 1987.

*Primary Examiner*—Tan V. Mai
*Attorney, Agent, or Firm*—Dykema Gossett

[57] ABSTRACT

A system and method for floating point computations involving matrices or vectors includes a plurality of identical processing units connected to a linear chain with direct data communication links between adjacent processing units. Each such processor is also connected to its own private memory. A sequence of instructions is sent by a controller to all floating point processing units and their associated memories whereby all processing units in the chain receive the same instruction and all memories receive the same address at any given cycle in the instruction sequence. Each processing unit internally handles floating point operations such as normalization, sign changes, and multiplication in a bit serial manner.

19 Claims, 8 Drawing Sheets

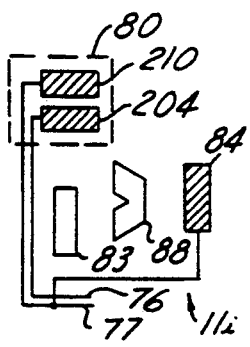
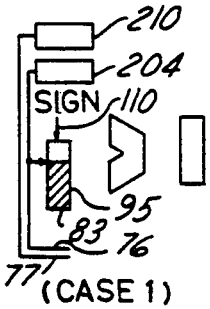
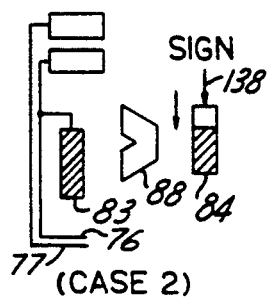
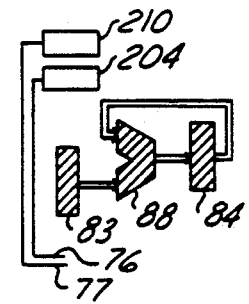
FIG.3A   FIG.3B (CASE 1)   FIG.3C (CASE 2)   FIG.3D
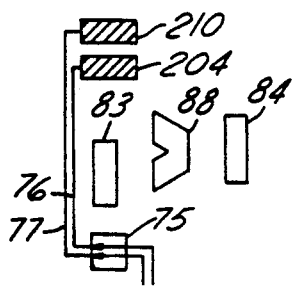
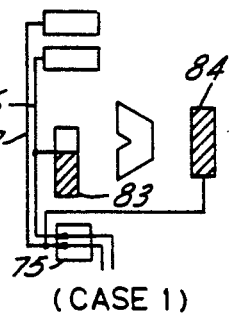
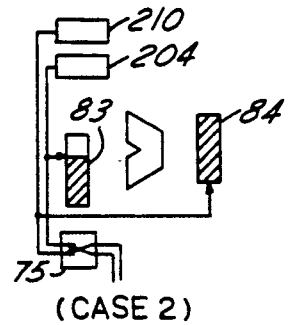
FIG.4A   FIG.4B (CASE 1)   FIG.4C (CASE 2)
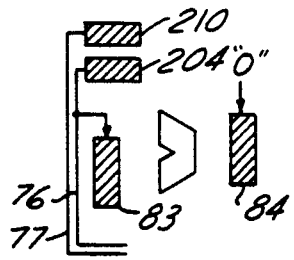
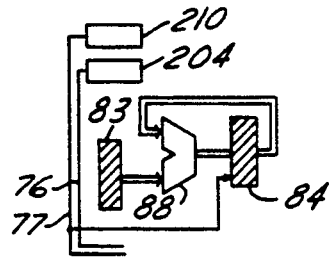
FIG.5A   FIG.5B
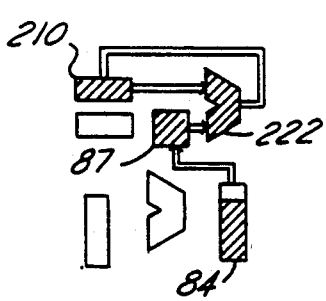
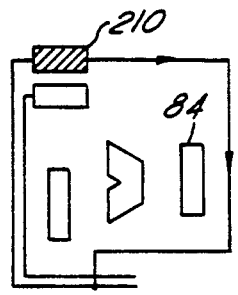
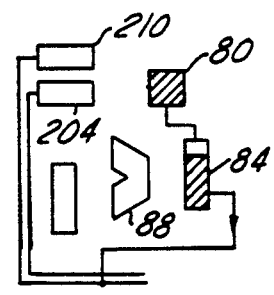
FIG.6A   FIG.6B   FIG.6C

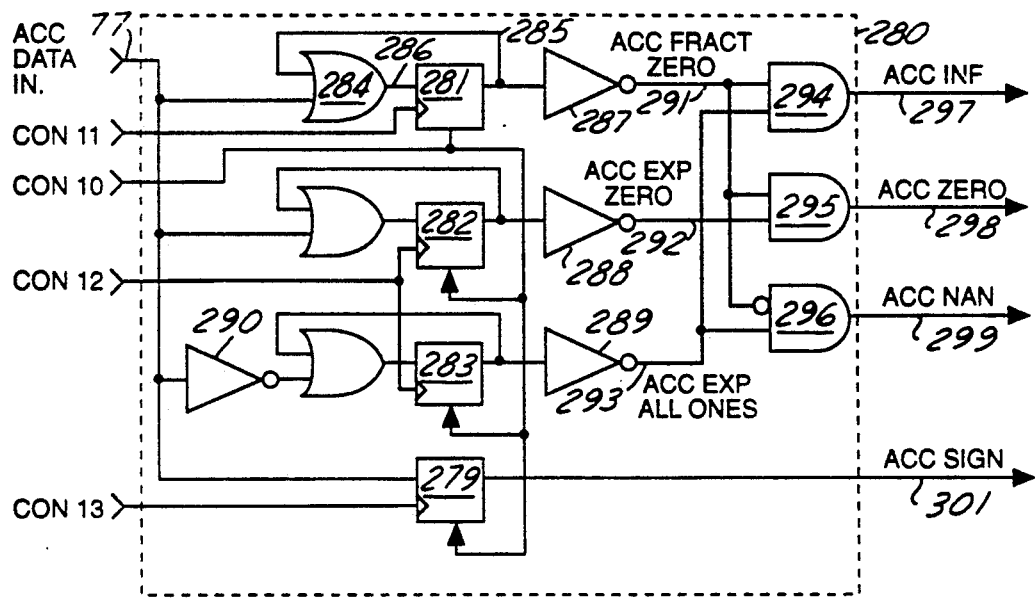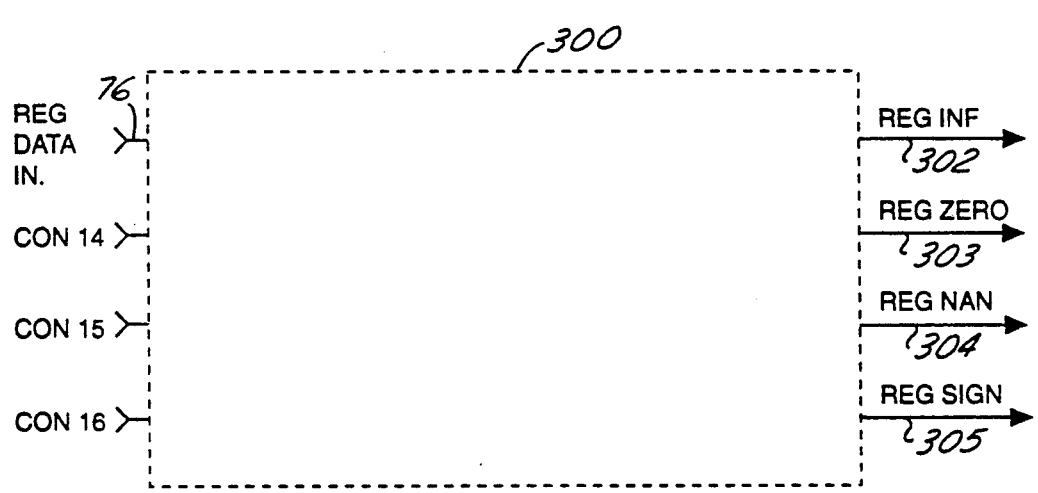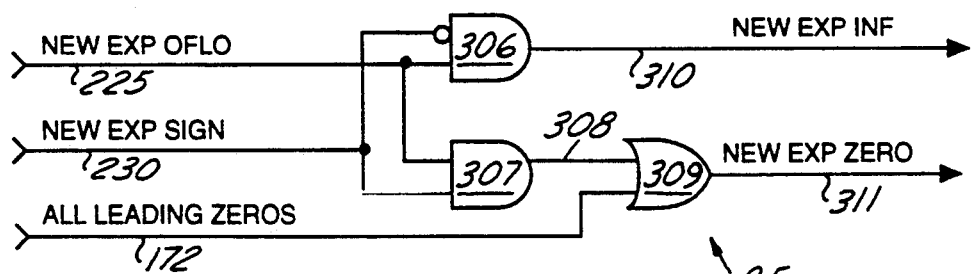
FIG.11

BIT SERIAL FLOATING POINT PARALLEL PROCESSING SYSTEM AND METHOD

This is a continuation of copending U.S. Ser. No. 07/203,408 filed on Jun. 6, 1988 now abandoned.

BACKGROUND OF THE INVENTION

1. Field of the Invention

This invention relates in general to systems and methods for high speed floating point computations involving long vectors or large matrices of data, and in particular to a parallel processing system and method employing an SIMD architecture for performing such computations.

2. Discussion of Related Art

In the 1950's and 1960's computers normally had a single central processing unit (CPU) and Von Neumann architecture. These computers were also typically constructed of discrete components and later simple integrated circuit components. Many of these components were very large and slow by today's standards and required many discrete or "off-chip" interconnections, which tended to reduce reliability significantly. On account of these and other factors, a premium was placed on minimizing the number of components required for the circuitry of the CPU and the arithmetic logic unit (ALU) within the CPU which performed the elementary mathematical computations such as addition and multiplication. Bit serial techniques for addition and multiplication were often used in preference to parallel addition and parallel multiplication techniques because, although much slower, bit serial circuitry used far fewer components than the parallel adders and multipliers. Since the bit serial circuitry in the ALU was usually sufficiently fast to keep up with other speed-limiting circuitry and other operations in the CPU, this did not normally present a problem.

In the early 1970's advances in integrated circuit fabrication techniques and design enabled the size and cost of fairly large circuits such as parallel adders and parallel multipliers to be reduced. It also allowed computers to operate with faster cycle times or instruction speeds. As a result, parallel adders and parallel multipliers virtually completely supplanted bit serial designs in Von Neumann machines. The use of the parallel adders and multipliers has continued with respect to supercomputers as The continuing demand for faster and powerful computers is driven in large part by many scientific and engineering applications which require very extensive computations, particularly computations involving arrays or matrices of floating point numbers. To meet this demand, a number of supercomputers have been developed and are commercially available for solving problems involving large amounts of floating point computations such as the CRAY 2S, and IBM 3090. In these systems, numerical operations are performed by floating point processing hardware. Numbers are transferred to the processing hardware via wide busses where the number of wires in the bus is greater than or equal to the number of bits in the floating point number, which is generally 64 bits. Floating point operations are performed by the processing hardware in one or two clock cycles and the results are transferred out on wide busses. In such systems which operate at hundreds of million floating point operations per second (Mflops), there is a critical bandwidth problem in coupling the processor with main computer memory. The problem is severe since each floating point operation can require three memory accesses: two for input operands, and one for the output result. To sustain such high speed operations, a complex system of registers, high speed cache memory, crossbar switches, and bussing to larger but slower main memory is required. All of the interconnections to these devices must be done with busses which are as wide as the data word. The most expensive part of a supercomputer is generally in the data communication pathways between the processor and main memory.

Another difficult problem in the design of supercomputers is the software controlled structure which supports the data communication. The microcode software must control the registers, cache memory, and crossbar switches so that algorithms can proceed most efficiently. The controller needed to support the simultaneous multiple tasks is very complex.

Numerical computations have been divided into two classes: vector and scaler. Vector operations involve performing the same operation on a long string of numbers, such as multiplying each element of one string by each element of another. Scaler operations are individual operations which can not be vectorized. Supercomputers are generally designed to handle both types of operations as efficiently as possible, although the vector operations are generally an order of magnitude faster in Mflops. The programs found in scientific or engineering problems involving, for example, fluid flow, temperature flow, and stress in mechanical structures largely use vector oriented operations. Thus, a system optimized for solving vector problems is very useful.

Current supercomputers are scaled to operate at an even higher speed by adding several processors which operate in parallel, thus compounding the complexity of the control system and the bandwidth problems from main memory to the floating point processors.

It has long been recognized in the computer industry that parallel processing architectures have the possibility of providing increased computation speeds and power at lower cost. Because of this, numerous parallel computer architectures have been proposed and studied and a number of different types of parallel processing computer systems have been built or are under construction.

There has been some success in parallel processing systems to date, but most, if not all, of the truly notable success has been achieved in specialized applications such as image processing. A good portion of this success is directly attributable to specialized parallel processing systems which are custom designed to meet the specific requirements of the intended application. For example, the assignee of the present invention has enjoyed success in designing parallel processing systems for image processing applications, and is continuing to work in this area. Recent advances made by the assignee of the present invention have been realized by building a parallel processing system along the lines described in my copending U.S. patent application Ser. Nos. 057,128 and 057,182 respectively entitled "Linear Chain of Parallel Processors and Method of Using Same" and "Neighborhood Processing System and Method", which were both filed on Jun. 1, 1987. Both of these copending applications are hereby incorporated by reference, as they are illustrative of the generally advanced state of the art, and of the parallel processing systems now being marketed by the assignee of the present invention, and as they have a number of attributes in common with the basic architecture of the processing system of the present invention. The attributes in common principally are: (1) the use of a linear chain of identical individual interconnected processing units, each of which has a processing element or cell; (2) the use of a local memory with each unit, the memory being arranged in a "multiple row-single column" format. However, as just mentioned, the systems described therein are directed to image processing applications and are not well suited for performing floating point computations at extremely high rates of speed, as is required for supercomputer applications.

The results achieved thus far in the field of vector operations using true parallel processing computer architectures have been mixed at best. Typically, such systems have not lived up to the expectations of providing greater processing speeds and power at a lower cost. Moreover the costs and complexity of both the hardware and software for such systems have proven to be significant. One summary of the many on-going activities in the parallel computer architecture is provided in the following articles of J. Bond, "Parallel-processing concepts finally come together in real systems", *Computer Design*, pp. 51-74 Jul. 1, 1987). The article indicates that a number of such systems utilize pipelined vector processors or floating point coprocessors at each node or processing cell, and are still rather complex and expensive. A number of these systems thus rely upon conventional floating point solutions implemented upon either conventional or custom-designed integrated circuit chips.

None of the many parallel processing systems discussed in the aforementioned article appear to use bit serial techniques for performing mathematical operations such as addition, multiplication or floating point computations. Moreover, none of the systems appear to provide a parallel computer architecture on a single printed circuit (PC) board which is capable of performing at 100 Mflops or better. Finally, most of the computer architectures discussed as being suitable for vector operations such as floating point computations seem to have a complexity approaching that of the more conventional supercomputers discussed above. Thus, it appears that a new approach to vector operations and floating point computations may be required if parallel processing systems are to live up to their expected potential of delivering more processing speed and power at lower cost.

Computational requirements in scientific problems such as chemical and nuclear modeling, and engineering problems such as turbulent airflow in aircraft design, will lead to computer requirements exceeding $10^{12}$ floating point operations per second (Teraflops). The present method of computer design will not be able to meet these requirements. The complex designs will have to give way to massively parallel SIMD designs because the instruction cycle times for even moderately parallel architectures will exceed the capabilities of picosecond logic, and even exceed limitations of the speed of light.

Therefore, a primary object of the present invention is to provide a low cost system capable of handling vector oriented problems at a minimum speed of hundreds of Mflops, with a potential of hundreds of thousands of Mflops.

Another object of the invention is to eliminate the costly hardware needed to support the high bandwidth of data between the floating point processors and main memory by using a parallel processing system which employs local memories connected to the individual floating point processing cells.

A further object of the invention is to simplify the type of controller structure which supports the processor and memory system, to provide for simpler methods of controlling floating point operations carried out thereby.

A still further object of the invention is to obtain higher speeds by adding more floating point processors without compounding the complexity of the system.

SUMMARY OF THE INVENTION

In light of the foregoing problems and to fulfill the foregoing objects, there is provided, according to the present invention, a system and method of parallel processing where floating point computations are performed on long vectors or large matrices of data. To introduce the invention, various important features or characteristics of the invention will first be generally described, and then a formal summary of the aspects of the invention presently perceived as most important will be given.

In this invention, a very large number of simple slower processing units are used where each processing unit receives the same instruction. This type of architecture is often called "Single Instruction, Multiple Data", or SIMD. This is in contrast to current supercomputers where there may be a few very complex processing units, each running its own instructions. This second type of architecture is often called "Multiple Instruction, Multiple Data", or MIMD. In the system and method of this invention, a plurality of identical individual processing units are preferably connected in a linear chain, where there is one processing unit for each element in the vector or one processing unit for each column in the matrix. Each processing unit is coupled to adjacent processing units in the chain. Connections to more distant processors are also preferably provided so that efficient longer range data transfers can occur. All processors in the chain internally operate in a bit serial mode although data may be transferred between processors in parallel to gain speed. Each processor is also connected to its own local memory. A controller broadcasts the same instruction to all processor units, and the same address to all the local memories.

As previously explained, conventional wisdom holds that bit serial circuitry is too slow for performing mathematical computations such as addition and multiplication at high rates of speed. However, although bit serial circuitry is about n times slower than parallel circuitry for performing the same operation, it also requires roughly about n times fewer components. Therefore, if the number of bit serial processors is increased about n times, such processors might be expected to perform at the same basic speed as, and only require roughly as many circuit components and as much real estate inside of a IC chip as, would a fast parallel adder/multiplier circuit with the same computing power. However, it turns out that there are a number of important advantages achieved in the present invention by using bit serial techniques which further increase its power and speed in terms of logic devices or gates per unit area on an IC chip. In particular, bit serial floating point processors offer the following unique advantages in minimizing circuitry needed to support arithmetic operations: (1) addition and multiplication can share about 80% of the same circuits; (2) normalization of a floating point number in parallel requires a barrel shifter where an entire word is shifted to a new location in one cycle, whereas with bit serial circuitry, a normalization only involves changing an input tap on a serial shift register, or extra shift cycles; (3) a parallel negation involves as many inverters as there are bits, while a serial negation requires only one inverter on the input or output stream; and (4) parallel multipliers involve a large array of complex circuits, whereas bit serial multipliers involve a simple shift-and-add concept.

To the best of my knowledge, prior to the present invention, no one had devised a processing system or method for using the foregoing inherent natural advantages of bit serial processing to construct a low-cost high speed floating point processor. The present invention builds upon the foregoing advantages, by using bit serial circuitry within each one of plurality of interconnected processor cells. This approach to processing units has the further distinct and important advantage of matching processor speeds to the slower speeds at which commercially available low cost main memory operates. This is achieved in the system of the present invention by employing a local columnar memory with each one of the processor units. The local memories are used to store one or more matrices, or at least large portions thereof, that are involved in an extended sequence of matrix or vector computations. Thus the most frequently used data resides in the local memories associated with the bit serial processors and this data can be used multiple times as the sequence of computation repeatedly loops through or otherwise accesses some or all of the one or more matrices. In this manner, the number of accesses which must be made to the main memory of the host computer system is greatly reduced, which drastically reduces the familiar bottleneck between main memory and the high speed floating point processors. Moreover, the accesses to the local memories can be performed en masse and at the more the pedestrian speed at which main memory functions, thereby eliminating the need to utilize high speed cache memory and the sophisticated control circuitry and programming that is needed make such memory work. In one sense then it may be said that the system and methods of the present invention match the speed of the floating point processing operations to that of main memory, and accordingly eliminate the need for much of the complexity and control circuitry of conventional high performance computers or floating point processors.

Using LSI circuit design, it would easily be possible with today's technology to integrate sixteen bit serial floating point processors on a monolithic chip. Sixty-four such multiple processors with associated memory could may be provided on a single circuit board, for a total of 1024 processors. Today's LSI technology can support 40 MHz bit serial data transfer, so that 32 bit floating point words would require 0.8 microseconds to transfer. A floating point operation requires 3 transfers, two for the input operands and one for the output, resulting in a total operation time of 2.4 microseconds. Thus, in this embodiment floating point operations would be performed at 1/2.4 Mflops or about 0.41 Mflops per processor. Thus, the system with 1024 processors would perform at a rate of 420 Mflops, which is unprecedented for a single board system.

40 MHz memory technology will also be required to match the processor speed of this invention. One possibility is to use high-speed static memory such as the Vitelic Corporation part number V61C67 which is a 16K×1 bit memory with a 25 nanosecond cycle time. Dynamic memories are lower cost and have a larger storage capacity. However, cycle time is longer. An effective 25 nanosecond cycle can be obtained from a 256K×4 bit dynamic memory such as the Toshiba part number TC514256 by operating in the page access mode, latching the four-bit nibble in a shift register, and then shifting serially to processors in four clock cycles. Reading serial data from the processors would be a procedure reversed from the above, where the same shift register accepts serial data from the processor and transfers a nibble to the memory chip.

Each processor (i.e., processing unit) of this invention is able to input and store two different floating point numbers. One number is called the register number and will be stored and used in a context that any microprocessor would use a register. The second number is called the accumulator number, which is stored in an accumulator register which not only has the function of temporary storage, but is also written over by results of operations. A floating point number consists of three parts: a sign bit, an exponent, and an unsigned fraction. The register number upon entering the processor cell is split into three parts: the register sign, the register exponent, and the register fraction. Similarly, the accumulator is split into an accumulator sign, an accumulator exponent, and an exponent fraction. These different parts go to different areas of the processor cell to be processed in different ways that will be fully explained in the detailed description which follows.

In the SIMD system of the present invention, although every processor is performing the same operations, the controller and processors work together in a way that allows the controller to be oblivious to various conditions in the various processors. For example, the processors operate correctly even though one might be multiplying an infinite number, while another is multiplying a number by zero.

Armed with the foregoing understanding of the general nature of the present invention, a more formal summary of the invention will now be given. According to one aspect of the present invention, there is provided a parallel processing system for performing floating point operations upon an array of data having a first dimension provided with at least n data elements where n is an integer having a value of at least 2, and each data element contains data representing a floating point number. The system comprises: an array of n individual processing units linked together by a plurality of connections such that adjacent processor units in the array are coupled to one another. Each of the individual processing units includes a processor cell for serially receiving data representing floating point numbers upon which floating point operations are to be performed, local memory means for storing such data, and a communications pathway for serially transferring such data between the processor cell and the local memory means. The value of n may also be equal or greater than 4, 8, 16, 32, 64, 256, 1,024 or more. The processing units are preferably substantially identical to one another, and the system may further comprise controller means for transmitting identical instructions to each of the processor cells. The system may also include input/output (I/O) means for transferring an array of data up to n numbers long between a computing device and the array of processing units. The I/O means may include an array of n shift register means associated with the array of n processing units for temporarily holding, transmitting and receiving data in parallel between the computing device and between the adjacent processing units. Each such shift register means is preferably associated with a distinct one of the processing units. The input/output means alternatively may be for serially transferring data corresponding to at least one individual floating point number between a computing device and any selected one of the n processing units. In this version of the I/O means, there is preferably provided at least one common communications pathway for carrying such data connected to each of the n processing units. In a preferred embodiment of the present invention, the I/O means is capable of accomplishing transfer of data in parallel or serially.

According to a second aspect of the present invention, there is provided a parallel processing system for performing floating point operations upon a matrix of data representing floating point numbers and having at least m rows and n columns, where m is an integer equal to or greater than 1 and n is an integer greater than 4. The system comprises: a chain of n identical individual processing units which are linked together by a plurality of connections such that adjacent units in the chain are coupled to one another, and each of the individual units includes a processor cell for performing floating point addition and multiplication operations using bit serial techniques, local memory means having multiple memory locations for storing at least part of a respective one of the n columns of data, and a bidirectional communications channel between the processor cell and the local memory means; controller means for providing a single set of identical instructions to all n processing units simultaneously; row addressing means for providing an identical row address to each the n local memory means; selection means for specifying which one of the n local memory means are to be enabled; means for transferring data representing a floating point number serially between a selected individual memory location within any one of the local memory means and a host data transfer device; and shift register means for transferring data representing at least part of a floating point number in parallel between the chain of processing units and the host device.

According to a third aspect of the present invention, there is provided a method of performing floating point computations at a high rate of speed using bit serial techniques. The method comprises the steps of: (a) providing an interconnected array of substantially identical processing units each of which includes a floating point processor cell; and (b) simultaneously performing at least a portion of a cycle of a bit serial floating point operation in at least a plurality of the processor cells. The method preferably includes the further steps of: (c) arranging the array of processing units in a linear chain at least 16 processing units long; and (d) providing a controller connected to each of the units for providing memory addresses, memory control signals and instructions to the units. The cycle of bit serial floating point operations may be for performing the addition of first and second floating point numbers. Alternatively, the cycle of bit serial floating point operations may be for performing a multiplication operation using first and second floating point numbers as multiplicand and multiplier.

According to a fourth aspect of the present invention, there is provided a method of performing floating point computations on a large array or matrix of data representing floating point numbers and having at least m rows and n columns, where m is an integer equal to or greater than 1 and n is an integer greater than 7. The method comprises the steps of: (a) providing a linear chain of n identical individual processing units linked together by a plurality of connections such that adjacent units in the chain are coupled to one another, with each of the individual units including a processor cell for performing floating point addition and multiplication operations, local memory means for storing a respective one of the n columns of data, and a communications channel between the processor cell and the local memory; (b) providing controller means for providing identical instructions to all n processor cells simultaneously and for providing address signals and memory enable signals to the n local memory means; (c) via the controller means, commanding all n processor cells to perform simultaneously a bit serial addition of two floating point numbers obtained from their respective local memory means; (d) via the controller means, commanding all n processor cells to transmit to their respective local memory means for storage therein the sums generated during step (c); (e) via the controller means, commanding all n processor cells to perform a bit serial multiplication of two floating point numbers obtained from their respective local memory means; and (f) via the controller means, commanding all n processor cells to transmit to their respective local memory means for storage therein the products generated during the step (e).

These and other aspects, objects and advantages of the present invention will be more fully understood by reference to the following detailed description taken in conjunction with the various figures and appended claims.

BRIEF DESCRIPTION OF THE DRAWINGS

The drawings form an integral part of the description of the preferred embodiments and are to be read in conjunction therewith. Like reference numerals designate identical components in the different Figures of the drawings, where:

FIGS. 3A-3D are pictorial diagrams of various stages in an addition operation;

FIGS. 4A-4C are pictorial diagrams of various stages in an addition operation where operands simultaneously enter from two different memories;

FIGS. 5A and 5B are pictorial diagrams of various stages in a multiplication operation;

FIGS. 6A-6C are pictorial diagrams of various stages in data output;

FIG. 11 is a circuit for detecting exceptions in a floating point number; and

DETAILED DESCRIPTION OF THE PREFERRED EMBODIMENT

Figure 1:
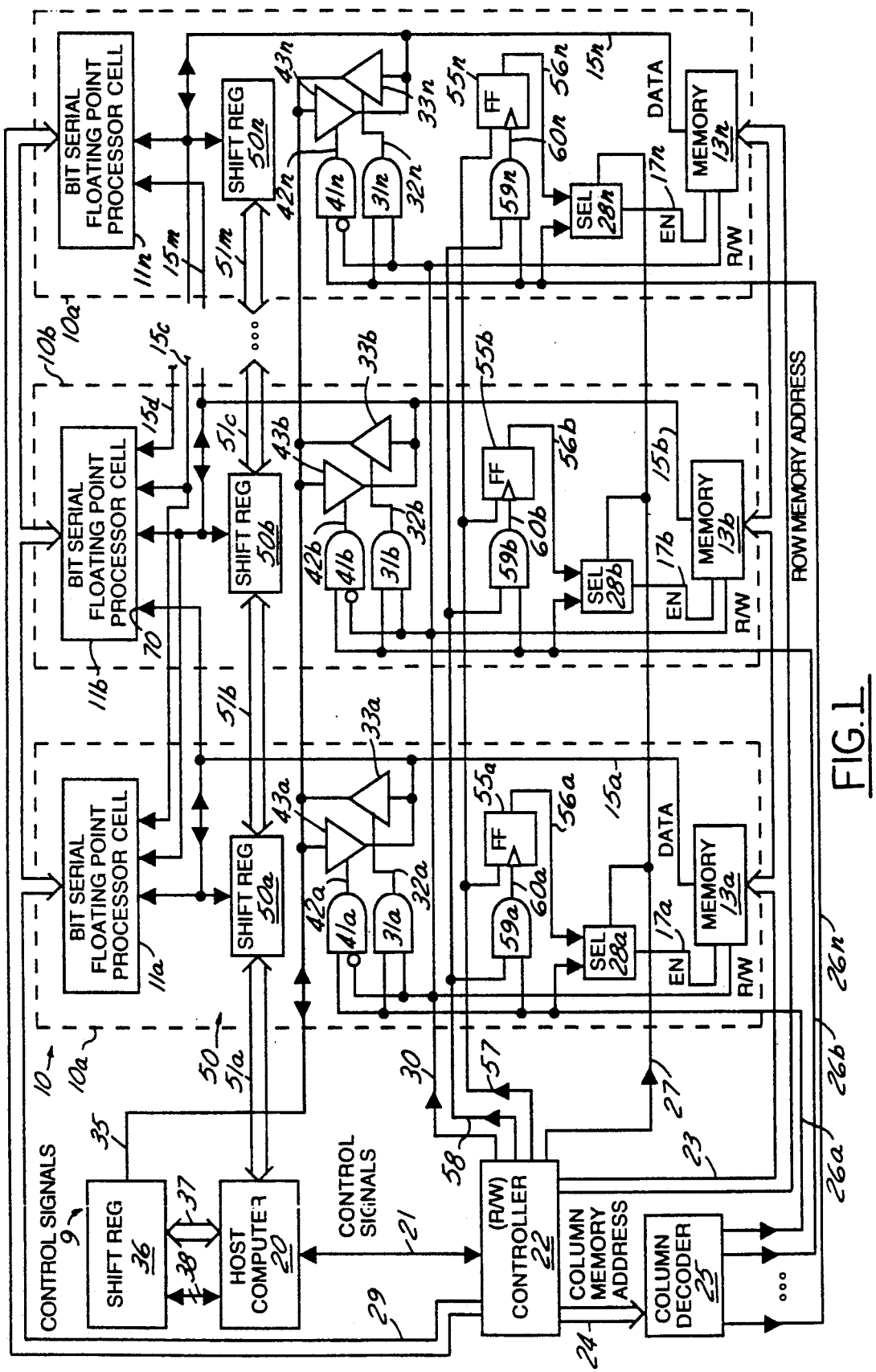
FIG. 1 is a block diagram of the bit serial floating point parallel processing system of the present invention showing the overall linear string of floating point parallel processors of the present invention.

OVERALL SYSTEM ARCHITECTURE (FIG. 1). Referring to FIG. 1, a parallel processing system 9 of the present invention comprises an array 10 of identical individual processing units 10a-10n comprising various data I/O paths, floating point processor cells 11a-11n, and an associated array of memories 13a-13n. Each individual processing unit (i.e., processor) is respectively associated with an individual memory, and connects to the associated memory via bidirectional data lines 15a-15n and memory enable lines 17a-17n. For example, processing unit 10b is associated with memory 13b.

Controller 22 outputs control signals via control lines 23, 24, 27, 30, 57, 58, and through decoder 25, also outputs control signals 26a-26n, to all processing units 10a-10n, to control data flow in the processing units. Controller 22 also outputs signals to control lines 29 to control the detailed bit serial cycles of floating point operations within processor cells 11a-11n. Controller 22 receives and interprets commands via lines 21 from host computer 20. For floating point operations, data is sent from memories 13a-13n to processor cells 11a-11n via lines 15a-15n; controller 22 sequences operations via control lines 29; then results are returned from the processor cells to memories 13a-13n. In a different operating mode, a processor cell can receive data from a memory in its own column, while simultaneously receiving data from a memory from a different column such as at point 70. The host 20 can send or receive floating point words to or from the processor array 10a-10n via lines 51a or lines 37. Host computer 20 and controller 22 may be of any conventional or suitable construction and employ conventional operating principles and functions. Accordingly, further functions of the controller and host computer will be explained in sections that follow only to the extent that they influence the parallel processor array 10.

Memory Structure and Data Storage Format. A two-dimensional m×n array or matrix of floating point words is stored in memories 13a-13n such that each of the n columns in the array is completely stored in one of the memories 13a-13n, where each bit of a word is stored serially in consecutive addresses. Integer m may have a value as low as one, but typically will be much higher. The various m rows of the array are preferably stored such that data at any particular address on memories 13a-13n will correspond to the same respective bits of words in the same respective row of the data array.

Each of the memories 13a-13n preferably has at least m rows, but may have an additional q rows which need not be utilized except when a larger matrix of data, such (m+j) rows by n columns is to be processed. The variables j, m, n and q are integer values, with j having a value between 1 and q. The values of m and of n may theoretically be as low as 1 and 2 respectively, and may assume any higher integer value up to 65,536 or more. Practically speaking, in order for the array 10 to be readily realizable using conventional LSI or VLSI design techniques commercially available through silicon foundries today to implement the processor cells and conventional dynamic random access memories (DRAMs) to implement the local memories 13, as the assignee of the present invention intends to do, the value of n will typically be some power of 2, such as $n=2^p$, where $p=4,5, 6. . .$, or 12. When the value of $p=10$ so that $n=1024$, it should be quite practical to implement the parallel processing system 9 on a single PC board as previously explained by using custom-designed processor chips each containing 16 processor cells 11, and any standard DRAM for each of the local memories 13a through 13n. The value of m then will depend on the DRAM used.

If the array is smaller in dimension than the length of array 10 or the depth of memories 13a-13n, it will be possible, to speed up computations by processing more than one row of data at a time in parallel, and/or to store more than one matrix of data in the local memories. For example, if there are four matrices of data, each matrix being 32 rows by 32 columns, and if memories 13a-13n each contain 64 rows and array 10 has 64 processors, then the four matrices can be handled at once in the following manner. The data can be loaded into the array 13 of local memories 13a-13n with the first and second matrices being located in the same columns in the first half of the memories, and third and fourth matrices being located in the same columns of the second half of the memories. The linear chain 10 of processors 10a-10n can then process equivalent rows of the first and third matrices (and of the second and fourth matrices) at the same time since they are "side-by-side" in the local memories.

Also, while this detailed description generally refers to the processing of a data array which is m rows by n columns wide, those in the art should appreciate that from the following discussion that the system 9 and the array 10 of the present invention can readily be used to process arrays of data that are fewer than m rows high or n columns wide, by simply not using or ignoring those rows in the memories 13 and/or those processors 10 outside of the boundaries of the data array being processed. Similarly, although the discussion refers to processing of two dimensional arrays of data, those in the art will also appreciate that arrays or matrices of data having three or more dimensions can be readily processed using the system 9 and processing array 10 of the present invention. By transferring data as necessary into and out of the array 10 via the shift registers 36 and/or shift registers 50a-50n, matrices larger than the storage capacity of the memory can be processed.

Selective Memory Enable. During a write operation on memories 13a-13n, specific memories can be enabled by signals on lines 17a-17n to write data therein while memories not enabled will not change their contents. In other words, any selected combination of the local memories 13a-13n, from any one memory up to and including all memories, can be enabled. There are two memory enable modes controlled by selectors 28a-28n. The first mode is called the "column address mode" and is active when control line 27 is in the logic "1" state. The second mode is called the "column enable mode" and is active when control line 27 is in the logic "0" state.

Column Address Mode. In the column address mode, only one of memories 13a-13n is enabled by controller 22. Controller 22 transmits a logic "1" on line 27, a column address on lines 24, and a row address on lines 23. The column address on lines 24 will be decoded by column decoder 25 so that only one of the lines 26a-26n corresponding to a specific column will receive a logic "1" state. The logic "1" signal on line 27 will cause selectors 28a-28n to transmit the respective logic states on lines 26a-26n to memory enable lines 17a-17n. Since only one of the lines 26a-26n is in a logic "1" state, then only one memory 13a-13n will be enabled, and data on lines 15a-15n will be written to the address specified by the row memory address on line 23.

Column Enable Mode. In the column enable mode, any combination of memories 13a-13n can be enabled by controller 22 which transmits, in this mode, a logic "0" on line 27, and a row memory address on line 23. A logic "1" on outputs 56a-56n of any flip-flop 55a-55n will correspond to an enable signal and will be transmitted to memory enable lines 17a-17n via selectors 28a-28n. Data on lines 15a-15n will be written to the address specified by the row address on lines 23 only in those memories enabled by signals on lines 17a-17n. In order to enable writing into a specific pattern of memories 13a-13n, the controller must first record that pattern in flip-flops 55a-55n by: (1) selecting each of the flip-flops 55a-55n one at a time using the column memory address on bus 24 decoded into lines 26a-26n, (2) transmitting the desired state of the selected flip-flop on line 57, and (3) transmitting a clock signal on line 58. The rising edge of the clock signal on line 58 will pass through only the selected one of AND gates 59a-59n, to one of clock inputs 60a-60n corresponding to the one decoded line from lines 26a-26n, thereby storing the state of input 57 into the selected one of flip-flops 55a-55n.

I/O Shift Register Structure. To facilitate transfer of selected individual data words between the host computer 20 (or comparable computing or data transfer device) and the processing units 10 and/or their associated local memories 13, a bidirectional serial data input-/output (I/O) line 35 connected to each processing unit and a shift register 36. Shift register 36 has multiple one-bit stages preferably equal in number to the number of bits in one floating point word. Register 36 also has serial inputs and outputs connected to line 35, and parallel inputs and outputs connected to lines 37 which run to the host 20. Host 20 controls the operations of register 36 via control signals provided over lines 38.

Since I/O line 35 is a serial bus with many connections made thereto, three-state output buffers 33a-33n and three-state input buffers 43a-43n are provided, which are respectively switched on and off by control signals on lines 33a-33n and lines 43a-42n. The use of these buffers will be explained shortly. The shift register 36 also includes suitable three-state input/output buffers (not shown) required to send and receive signals along line 35. The use of such suitable buffers, and of various latches, control and timing signals is very well understood by those of ordinary skill in the art of the computer system design. Accordingly, such items, although required, will not be mentioned in this detailed description or shown in the Figures except as is deemed necessary or desirable in order to gain a full appreciation of the processing system and method of the present invention.

To facilitate mass transfer of data in parallel between the processor array 10 and the host computer 20 (or comparable device), an array 50 of shift registers 50a-50n are provided, with each register 50a-50n being associated with a respective one of the processors 10a-10n. Each of the shift registers 50a-50n includes a linear string of one-bit stages, with the number of stages preferably being at least equal to the number of bits in one floating point word. As previously mentioned, it would be desirable to implement each group of processing units on a single IC chip. Due to pin-out limitations on such chips, it may not be practical to have each such shift register hold or transfer even one floating point word at a time, especially if the number of bits per word is large. In this regard, it may necessary or desirable, especially when the number of bits per word is large such as 80, 96 or more, to store or transfer only a fractional part, such as one-third or one-half, of a single word at a time. If the size of the words, or conventional or suitable interconnection technologies, make it practical to provide larger shift registers, then higher data transfer rates, the size of each of the shift registers 50a-50n may be increased to store two or more floating point words at once.

The shift registers 50a-50n each include serial inputs and outputs connected to the respective serial data line 15a-15n, which as shown is also connected to its respective processor cell 11a-11n and to an adjacent processor cell (except in the case of the processor unit 10n). The registers 50a-50n also include bidirectional parallel inputs and outputs, which are connected to parallel data bus lines 51a-51m.

Host Serial Data Input. Host computer 20 can receive data over serial data I/O line 35 connected to shift register 36 from any specific location in any one of the memories 13a-13n. by sending appropriate control signals via line 21 to controller 22 in order to activate the column address mode previously described. Controller 22 transmits the desired column memory address on lines 24, and the desired row address on lines 23, a logic "1" on line 27 to invoke the column address mode, and a logic (1) or read enable state on read/write line 30. Suppose, for example, that line 26b is the column address decoded as a logic "1", then AND gate 31b will pass a logic "1" state to tristate buffer enable line 32b. No other tristate buffer enable line 32a-32n will be a logic "1" since line 26b is the only column address decoded by column decoder 25. Thus, only tristate buffer 33b will thereby be enabled to transfer memory data on line 15b to line 35. Data on line 15a corresponds to the least significant bit of a floating point number, and is clocked into shift register 36. The above cycle is repeated several times while controller 22 transmits consecutive addresses via line 23 to memory 13b thereby causing all other bits of the floating point number to be shifted into shift register 36 via line 35. Finally, host 20 can then read the complete word on shift register 36 via parallel I/O Host Serial Data Output. Conversely, host 20 can transmit a floating point word to a specific row and column by first writing the complete floating point word to shift register 36 via parallel I/O lines 37 and causing controller 22 to address memories 13a-13n in a manner identical to that for the host input operations, except that read/write line 30 is placed in a logic "0" or write enable state. Like in the foregoing example if only line 26b is at a logic "1", only AND gate 41b will transmit a logic "1" to three-state buffer enable line 42b, which in this example, causes data on line 35 from shift register 36 to be transferred to memory data line 15b via three-state buffer 43b. Since read/write line 30 is in the write enable state, memory 13b will thereby be enabled to write one bit of data from the serial output line 35 of shift register 36 into memory 13b. Other bits of data in shift register 36 are read into memory 13b as controller 22 transmits consecutive row addresses via line 23 while clocking successive data bits out of shift register 36 until the entire floating point word in shift register 36 has been read to consecutive locations in memory 13b.

Host Row Parallel Data I/O. Host computer 20 can cause a whole row of data to be quickly written to memories 13a-13n by transmitting consecutive words of a specific row to the parallel inputs of shift register 50a via lines 51a. The contents of shift registers 50a-50n will shift to the right via parallel bidirectional lines 51b-51m, until an entire row of numbers are contained in shift registers 50a-50n. Next, controller 22 will transmit a logic "0" on line 27 to invoke the column enable mode, and transmit a logic "0" on read/write line 30 so that those memories 13a-13n enabled by flip-flops 55a-55n in the column enable mode will write data therein from the serial outputs of shift registers 50a-50n which are coupled to the data lines 15a-15n. Controller 22 will then cause shift registers 50a-50n to shift the data words up, one bit at a time, to memories 13a-13n via lines 15a-15n, while outputting consecutive memory addresses via address lines 23, so that after the entire word is shifted out from shift registers 50a-50n, all memories 13a-13n will contain the entire floating point words.

Host computer 20 can quickly read a whole row of data from a specified row of numbers in memories 13a-13n by a procedure reversed from that described above. In the column enable mode, controller 22 will transmit consecutive row memory addresses via lines 23 to memories 13a-13n while clocking memory data via lines 15a-15n into the serial inputs of shift registers 50a-50n, until all bits of the floating point words in the specified row have been stored in shift registers 50a-50n. Then shift registers 50a-50n will start shifting to the left through parallel lines 51a-51n into host computer 20 until the entire row of data has been transmitted to host 20.

Figure 2:
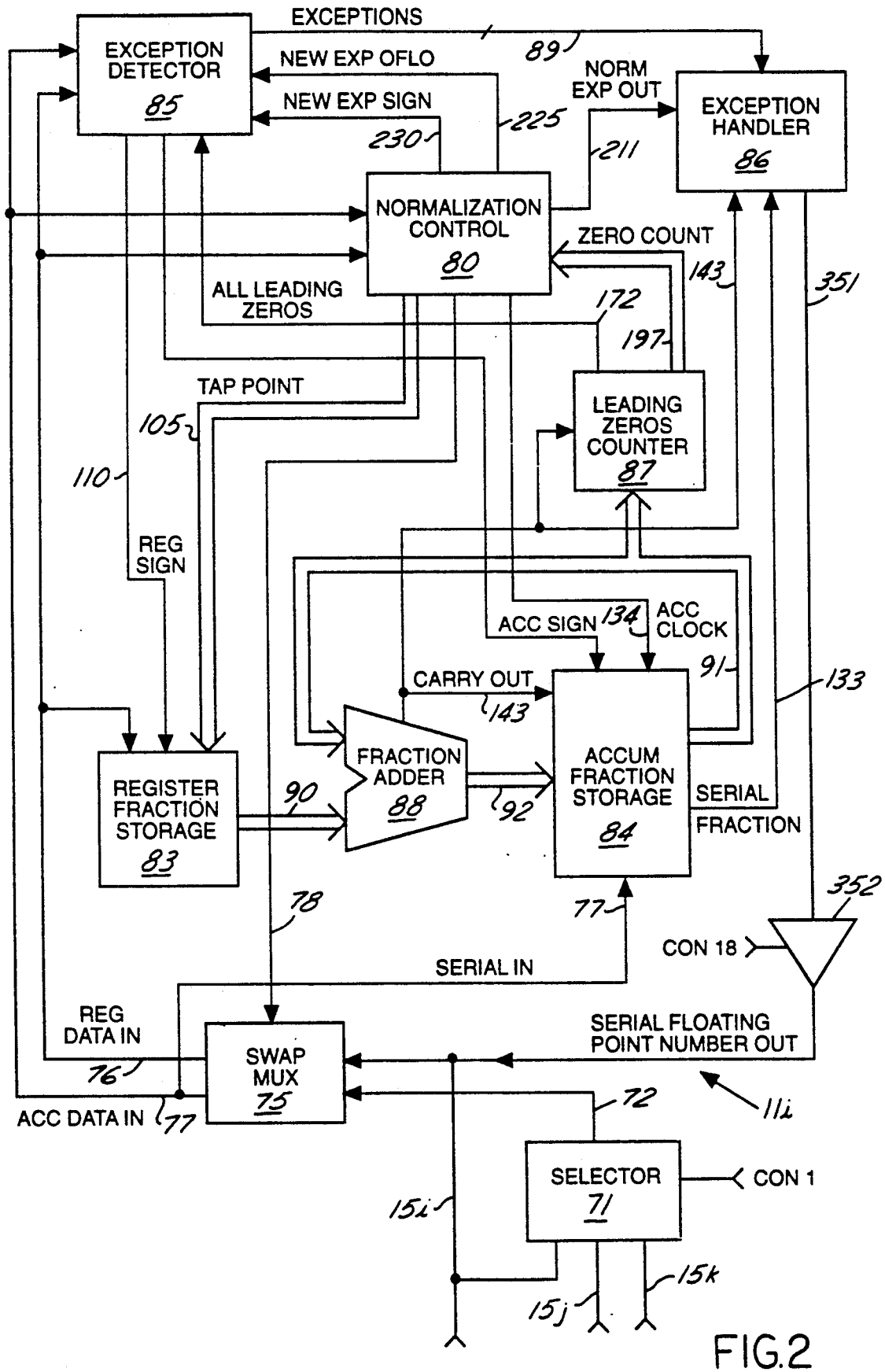
FIG. 2 is a general block diagram of a typical processor cell.

PROCESSOR CELL OVERVIEW (FIG. 2). Referring to FIG. 2, a typical block diagram of any one of the identical bit serial floating point processor cells 11a-11n, for convenience called cell 11i, is shown. Serial data will enter local serial data line 15i from the associated memory 13i. Data on line 15i or from the two adjacent processor units 10j and 10k on the right via local data lines, 15j, 15k, will enter selector 71 where data from one of said memory lines will be selected by selector 71 and transmitted to line 72 according to the state of selector control lines CON1 which comes from controller 22. Note that, if desired, similar connections (not shown) to other processors, such as processors 10e, 10f, 10g, 10l and/or 10m, could also be provided. For convenience, a number of other control lines described in subsequent figures are called lines CON2, CON3, etc., since they originate from controller 22.

Switch 75, which may also be called a swap-multiplexer or swap-mux either transmits or passes data from line 15i to line 76 and from line 72 to line 77, or reverses the streams and transmits or passes data from line 15i to line 77, and from line 72 to line 76. The operation of swap mux 75 is controlled according to the state of an input controlling signal 78 transmitted by the normalization control circuit 80.

The various parts of the incoming floating point words will be split. The fraction parts will be sent to the register fraction storage circuit 83 via line 76, and the accumulator fraction storage circuit 84 via line 77. Exponent parts will be sent to the normalization control circuit 80 via lines 76 and 77. The sign bits of floating point words will be sent to the exception detector 85 via lines 76 and 77.

Exception detector 85 detects various special cases of floating point numbers such as overflows, underflows, infinite numbers and zero. Signals indicating detection of these special conditions are passed along lines 89 to exception handler 86. Exception handler 86 monitors these and other special conditions such as results that are undetermined such as infinity minus infinity, and modifies the output data produced by the cell 11i as necessary before it is passed back to the memory 13i. Leading zeros counter 87 is a circuit which counts the most significant (or leading) zeros in the fraction part of a floating point number so that a new normalization can be computed. Adder 88 performs a parallel sum of the output from the register fraction 83 on lines 90 with the output from the accumulator fraction 84 on lines 91. Output from adder 88 is sent to accumulator fraction circuit 84 via parallel lines 92.

Functions of other signal paths in FIG. 2 will become apparent in later, more detailed discussions of the major components of the floating point processor cell.

ADDITION/MULTIPLICATION OVERVIEW (FIGS. 3-6). A pictorial overview of addition and multiplication operations in the invention will be given in FIG. 3 through FIG. 6. These Figures will be an abbreviated view of key components of a typical processor cell 11i where cross-hatched components or selected areas thereof represent regions of activity. One important operation to be shown is that of bit serial alignment, where if two floating point numbers to be added do not have equal exponents, then the exponent and fraction parts of the smaller number must be adjusted by downshifting the fraction part of the smaller number by an amount equal to the difference in exponents, and setting the exponent of the smaller number to that of the larger number. Then, the fraction parts can properly be added.

Referring to FIG. 3A, the components of processor 11i shown are: register fraction storage 83, fraction part adder 88, accumulator fraction storage 84, register exponent storage 204, and accumulator exponent storage 210. Storage 204 and storage 210 form part of normalization control 80, and will be described further, especially in connection with FIG. 10.

The first three steps in floating point addition are data input steps and are represented in FIG. 3A by the cross-hatched areas. First, the accumulator exponent 204 is serially loaded, next accumulator fraction 210 is serially loaded and finally, register exponent 204 is serially loaded. Then the two exponents are compared, and an alignment operation is performed, in one of two ways, depending upon the results of the comparison. The two different cases will now be described.

Referring to FIG. 3B, if the register exponent is smaller than the accumulator exponent (Case 1), then register fraction 83 is serially loaded via a tap in the register fraction shift register, as shown by cross-hatched region 95. The sign bit is loaded via connection 110 to effectively extend the sign of the fraction to the most significant bits. The tap point is selected or located so that the register and accumulator fraction numbers are aligned.

Referring to FIG. 3C, if the register exponent is greater than the accumulator exponent (Case 2), then register fraction 83 is serially loaded at the top of the register fraction shift register. During the loading of the register fraction, the accumulator fraction in storage 84 is down-shifted by an amount equal to the difference in exponents. The accumulator number sign bit is loaded via connection 138 to effectively extend the sign of the accumulator to the most significant bits. In this manner, the register and accumulator numbers are aligned.

After the alignment step of FIG. 3B or FIG. 3C, the two fractions are added. Specifically, referring to FIG. 3D, adder 88 sums register fraction in storage 83 with accumulator fraction in storage 84 and stores the result in accumulator fraction storage 84.

Referring to FIGS. 4A–4C, the case where two numbers simultaneously enter from different memories is shown. First, as illustrated in FIG. 4A, the two exponents are serially shifted into exponent registers 210 and 204. Then, the contents of the two registers 204 and 210 are compared, and as in the FIG. 3, two different cases which upon the results of the comparison may be defined.

Referring to FIG. 4B, if the register exponent is smaller than the accumulator exponent (Case 1), then register fraction is serially loaded via a tap in the register fraction storage 83, in the same manner as that shown in FIG. 3B. Accumulator fraction is also simultaneously loaded into storage 84. The tap point is selected or located so that the register and accumulator numbers are aligned.

Referring to FIG. 4C, if the register exponent is greater than the accumulator exponent (Case 2), then swap mux 75 interchanges the paths of the fraction parts of the two incoming numbers. The fraction part of the accumulator number is sent to register fraction storage 83 and is serially loaded via a tap in the register fraction shift register, and the fraction part of the register number is sent to accumulator fraction storage 84. The register and accumulator numbers are now aligned although they are in different places than usual. The fractions can now be added as described in FIG. 3D.

Referring to FIG. 5, the multiplication of two floating point numbers is shown. First, as indicated in FIG. 5A, the register exponent and fraction are loaded into storage 204 and 83 respectively while accumulator fraction storage 84 is loaded with zeros. Then the accumulator exponent is loaded into storage 210. The exponents in storages 204 and 210 are then added and results stored in storage 210.

Referring to FIG. 5B, the accumulator fraction part is read in, starting with the least significant bit, but it is not immediately placed into the accumulator fraction 84 without change. Instead, the incoming fraction bits of the accumulator number are examined and used to operate the processor cell 11$i$ to perform a conditional add that effectively controls the operation of storage 84 and adder 88 as will now be explained. If the incoming fraction bit is a logic "1", the register fraction in storage 83 will be added by adder 88 to the accumulator fraction value from storage 84, and the results are stored in storage 84, after a single down-shift. If the incoming fraction bit is a logic "0", then no addition takes place, and the current accumulator contents in storage 84 are down-shifted. By using this "shift-and-add" technique, the multiplication operation is easily performed. After the operation is complete, the product of the two fraction parts will be present in accumulator fraction storage 84.

Referring to FIG. 6A, output normalization is shown. After floating point addition or multiplication operations, the resulting number may not be normalized, in that there may be leading zeros in the accumulator fraction. The number of leading zeros must be subtracted from the exponent and eliminated from the fraction before the number can be stored back into memory. The count of leading zeros 87 in the accumulator fraction in storage 84 is subtracted from the exponent 210 by adder 222. Referring to FIG. 6B, the normalized exponent 210 is then serially shifted out. Referring to FIG. 6C, the fraction part is serially shifted out. Normalization control 80 will alter the clocking of accumulator fraction 84 so that shifting out the leading zeros will be avoided.

Figure 7:
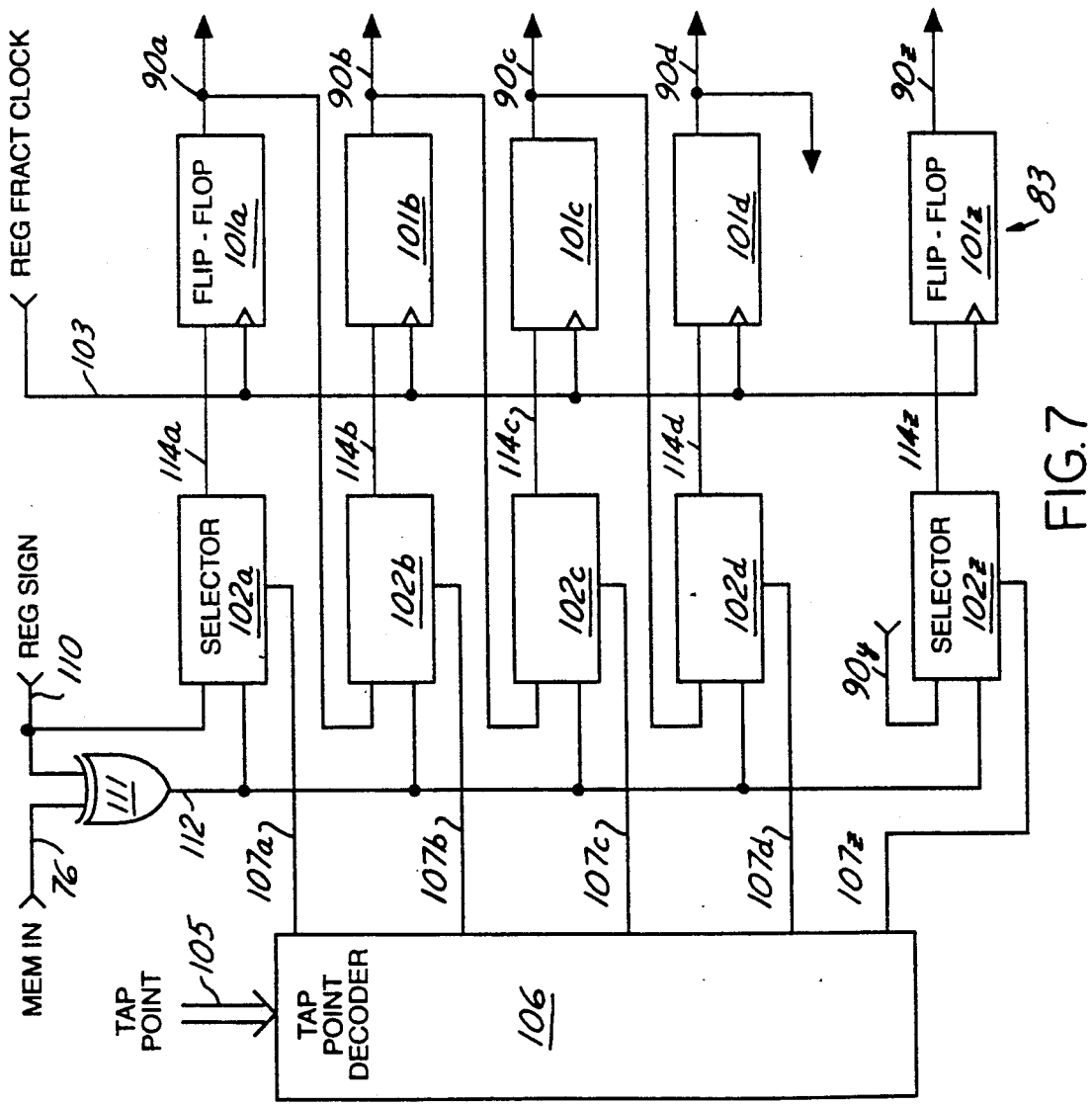
FIG. 7 is a detailed diagram of circuits which handle and store the fraction part of a floating point number in a typical register.

REGISTER FRACTION CIRCUIT (FIG. 7). Referring to FIG. 7, a detailed diagram of register fraction storage circuit 83 is shown. Flip-flops 101$a$–101$z$ along with selectors 102$a$–102$z$ comprise a special kind of shift register which is large enough (that is, has enough one-bit stages) to contain the fraction part of a floating point number. Flip-flops 101$a$–101$z$ are clocked by signals from controller 22 via line 103. Tap point input 105 is a set of parallel lines from the normalization control 80 and is connected to tap point decoder 106. Output lines 107$a$–107$z$ from decoder 106 are connected as control lines to selectors 102$a$–102$z$. The value of the tap point on lines 105 is decoded such that no more than one of the lines 107$a$–107$z$ will be in a logic "1" state. A zero value on tap point 105 will cause line 107$a$ to transmit a logic "1" state. Encoded "1", "2", etc. values on tap point 105 will cause a logic "1" state to be output respectively on lines 107$b$, 107$c$, etc.

The logic state of line 110 is transmitted from the exception detector 85, and is the value of the sign bit for the floating point fraction to be stored in flip-flops 101$a$–101$z$. If the value of the sign bit on line 110 is a logic "0", which corresponds to a positive sign, then the state of line 112 which is output from exclusive OR gate 111 will be the same as that on the memory line 76. However, if the sign bit on line 110 is a logic "1", corresponding to a negative sign, then exclusive OR gate 111 will cause output 112 to be inverted with respect to the data on memory line 76. The inversion of data by exclusive OR gate 111 serves as a converter to transform unsigned floating point fractions to signed numbers.

If the value on tap point 105 is zero, then the resulting logic "1" output on line 107$a$ will cause selector 102$a$ to pass the signed number data on line 112 to line 114$a$ input to flip-flop 101$a$. All other decoder output lines 107$b$–107$z$ will therefore transmit a logic "0" to the control inputs of selectors 102$b$–102$z$, thereby causing selectors 102$b$–102$z$ to pass the logic state of the output lines 90$a$–90$y$ respectively to flip-flops 101$b$–101$z$. After the entire fraction part of the floating point number is clocked in this manner, the most significant bit of the fraction will be in flip-flop 101$a$ and the least significant bit will be in flip-flop 101$z$. The above action is equivalent to a serial shift, where flip-flops 101$a$–101$z$ act as a shift register. FIG. 3C shows a visualization of data flow into the flip-flops in register fraction storage circuit 83.

If tap point 105 encodes the value "2", for example, then line 107$c$ will be a logic "1", and selector 102$c$ will pass the signed value on line 112 to the input 114$c$ of flip-flop 101$c$. After the entire fraction part of the floating point number is clocked to flip-flops 101$c$–101$z$, the most significant bit of the fraction will be in flip-flop 101$c$, and some least significant bits will be lost. Since decoder line 107$a$ is a logic "0", selector 102$a$ will cause the sign bit data on line 110 to be shifted into flip-flop 101$a$ via line 114$a$. After the fraction part is completely clocked into flip-flops 102$c$ to 102$z$, the sign bit will be clocked into flip-flops 101a and 102b. FIG. 3B shows the visualization of the flip-flops in register fraction 83 being filled with the input data for a tap point signal not equal to zero. The cross-hatched region indicates that flip-flops being filled part way down, and the sign bit 110 entering at the top as indicated by arrow 138. The above action results in floating point fraction data being loaded in a shifted position with a sign extension to the more significant bits, where the tap point number on line 105 encodes the input "tap" where the data is to be entered. The tap point is used for aligning fraction data as it is being read from memory line 76 for a subsequent floating point addition. If the tap point encodes a number which is larger than the number of flip-flops 101a-101z, then no decoder output 107a-107z will be a logic "1", so that all flip-flops 101a-101z will be filled with the sign bit.

Figure 8:
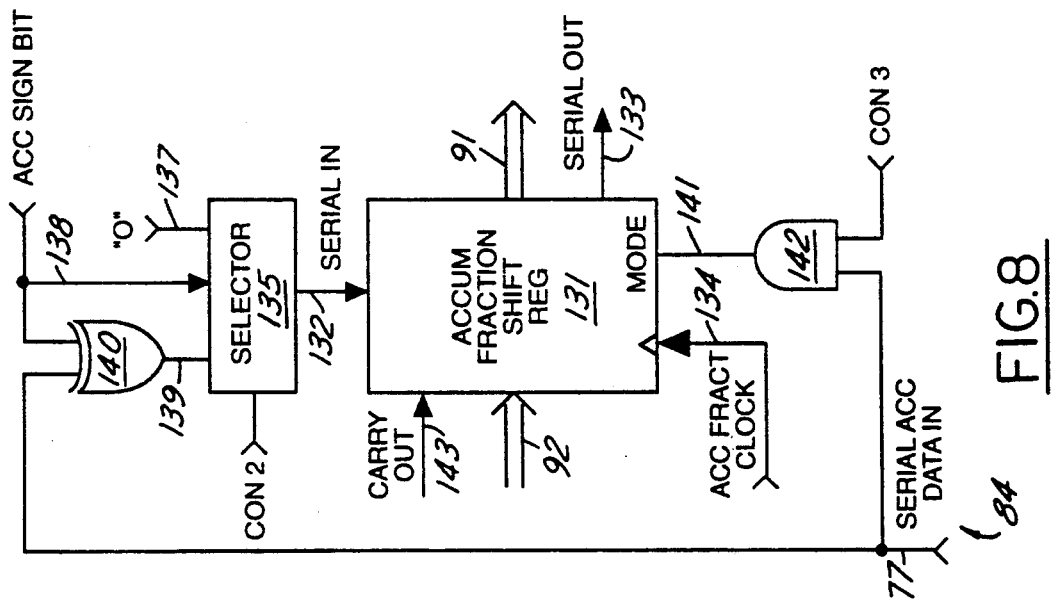
FIG. 8 is a detailed diagram of circuits which handle and store the fraction part of a floating point number in a typical accumulator.

ACCUMULATOR FRACTION CIRCUIT (FIG. 8). Referring to FIG. 8, a detailed diagram of the accumulator fraction circuit 84 is shown, where shift register 131 has parallel outputs 91, parallel inputs 92, a serial input 132 and a serial output 133. Shift register 131 is large enough to hold the entire fraction part of a floating point number and is clocked by signals from controller 22 via line 134. Serial input 132 to shift register 131 is derived from selector 135 where control signal CON2 from controller 22 can cause a selection of a logic "0" on line 137, of the accumulator sign bit 138, or of data from line 139 which is output from exclusive OR gate 140. The data on line 139 is unaltered by exclusive OR gate if the sign bit on line 138 is a logic "0", which corresponds to a positive sign. However, if the sign bit on line 138 is a logic "1", corresponding to a negative sign, then exclusive OR gate 140 will cause output 139 to be inverted with respect to the data on memory line 77.

Control signal CON2 causes a selection of line 139 when a new fraction is in the process of being clocked in, where floating point addition will later take place. The inversion of data by exclusive OR gate 140 will convert the unsigned floating point fractions to signed numbers. Control line CON2 will cause a selection of sign bit 138 when the signed fraction is being serially shifted for purposes of alignment prior to a floating point addition operation. Control line CON2 will cause a selection of the logic "0" on line 137 when an unsigned fraction is being serially shifted during an unsigned multiplication operation.

Line 141 from AND gate 142 connects to a shift register mode input. A logic "0" on line 141 will cause shift register 131 to serially shift the contents therein during a clock cycle, whereas a logic "1" on line 141 will cause a loading of the data on parallel input lines 92 and 143. The carry-out data on line 143 is loaded into the most significant bit position in shift register 131 while the data on lines 92 is loaded into the lesser significant bits of shift register 131. Thus, if control line CON3 is a logic "0", then shift register 131 will be in the serial shift mode. If line CON3 is a logic "1", then shift register 131 will perform a parallel load of data on lines 92 and 143 only during clock cycles where data on memory line 77 is in a logic "1" state. Control signal CON3 is a logic "1" only during a multiplication operation.

Multiplication of Fraction Parts. The multiplication operation on the fraction parts of floating point numbers will now be presented in more detail. First, the fraction part of the multiplicand must be loaded into flip-flops 101a-101z of the register fraction storage 83. A zero tap point is used so that the entire fraction is contained in the flip-flops. Accumulator fraction shift register 131 is concurrently loaded with zeros which are selected from line 137 via selector 135. A pictorial diagram of the loading of the fraction parts into register fraction storage 83 and accumulator fraction storage 131 is shown in FIG. 5A. Controller 22 then transmits a logic "1" to line CON3 and a signal on line CON2 which causes selector 134 to pass the logic "0" on line 137 to serial input 132 of shift register 131.

While each bit of the fraction part of the multiplier is being clocked from memories 13a-13n via lines 77, shift register 131 is also simultaneously clocked via line 134. If a multiplier bit on line 77 is a logic "0", then shift register 131 will be in a serial input mode, and the contents therein will shift serially once, while the "0" on line 132 will shift into and occupy the most significant bit position. If a multiplier bit on line 77 is a logic "1", then shift register 131 will be in the parallel input mode, and the contents therein will be replaced by the data from adder 88, which presents a sum on lines 92 and carry-out signal on line 143. The carry-output data on line 143 will occupy the most significant bit position of shift register 131, and the sum 92 will occupy the next significant positions. The sum on lines 92 is produced by the addition of the multiplicand fraction in register fraction circuit 83 and the current contents of the accumulator fraction in shift register 131. The sum is also down shifted as it is input to shift register 131. FIG. 5B shows a pictorial view of the above operation.

Figure 9:
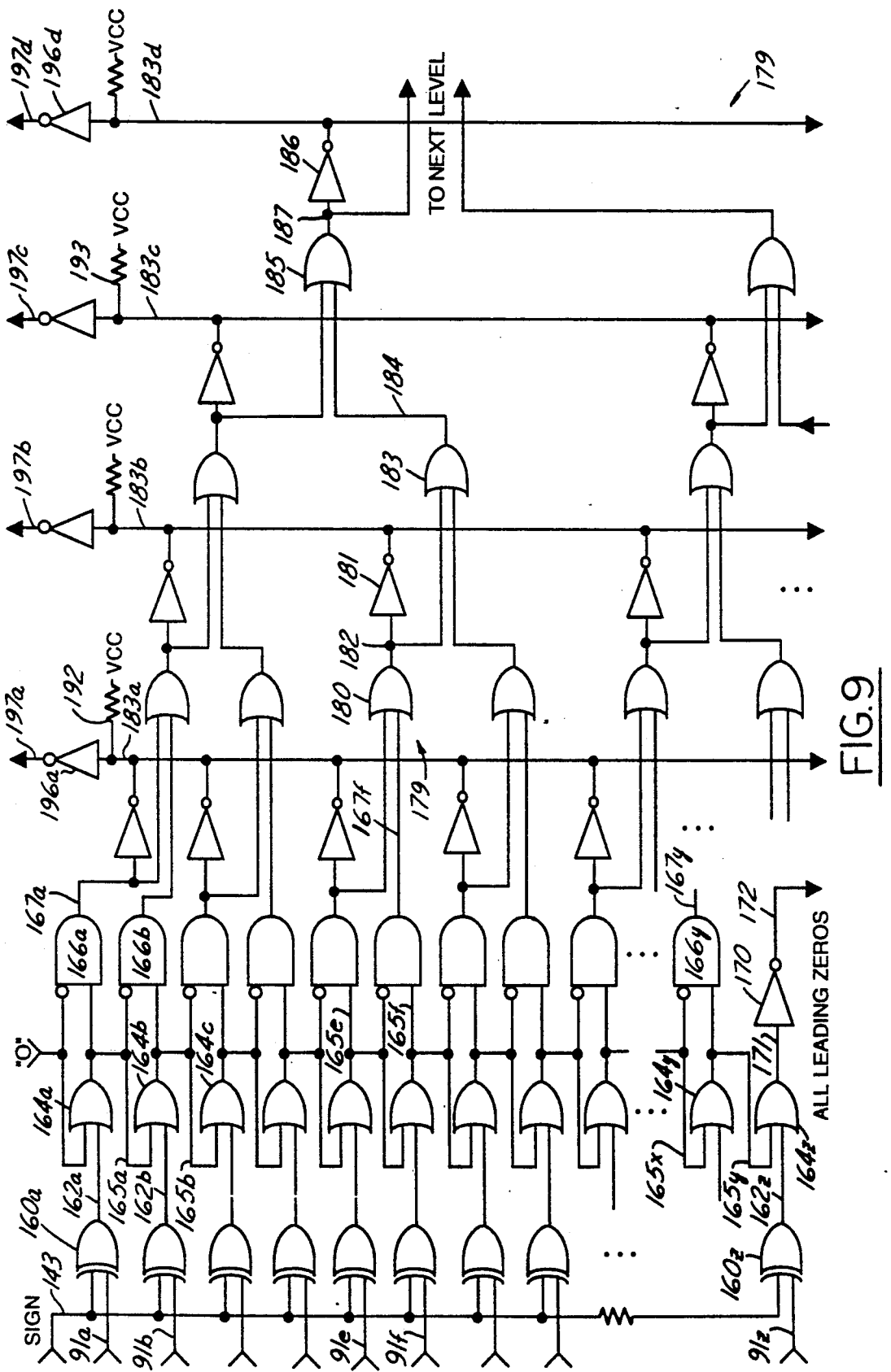
FIG. 9 is a circuit for counting the leading zeros in a number stored in the fraction part of the accumulator.

It is apparent that the above procedure is a multiplication operation similar to the method used when multiplication is done on paper. However, since the multiplier elements are only ones or zeros, the multiplication table is simple in that a multiplication by zero is a simple shift where there is no other change to the accumulator fraction shift register 131, whereas a multiplication by one is equivalent to an addition of the multiplicand to the accumulator while shifted to the next most significant position. A major difference in this invention relative to conventional digital multiplication operations is that value of the multiplicand does not shift to the next higher position, but, instead the accumulator shifts to the next lower position LEADING ZEROS COUNTER (FIG. 9). A preferred implementation of leading zeros counter circuit 87 is shown in FIG. 9. The purpose of this circuit is to count the number of most significant zeros in the fraction part of a floating point number so that the normalization control 80 will have enough information to be able to renormalize the floating point number by shifting the fraction part in such a way that the leading zeros are eliminated, and then adjust the new exponent part appropriately. However, if the sign of the fraction part, as received on line 143, is negative, then the circuit 87 will first logically invert the fraction before counting the zeros. Priority encoders such as Texas Instruments type 74LS384 can be cascaded to serve a similar function as illustrated in "TTL Data Book Volume 2" 1985, on page 3-983; however, the preferred implementation as described here is better for LSI implementation.

Each parallel output line 91a-91z from the accumulator fraction circuit 84 enters an exclusive OR gate 160a-160z, where second inputs therein are the sign bit 143 of the fraction word. Exclusive OR gates 160a-160z serve to convert signed numbers to unsigned numbers so that the count of leading zeros will operate correctly independent of the sign. Outputs 162a-162z of gates 160a-160z are respectively input to OR gates 164a-164z. A second input to OR gate 164a is a logic "0". Second inputs to the remaining OR gates 164b-164z are outputs 165a-165y, so that any OR gate 164b-164z receives the output of the OR gate immediately above.

Any of the OR gates 164a-164z coupled to inputs 162a-162z which are leading zeros will output a zero. The first OR gate to encounter a logic "1" on inputs 162a-162z however will output a logic "1" and cause all subsequent OR gates to output a logic "1". AND gates 166a-166y respectively receive the signals from OR gates 164a-164y via lines 165a-165y. A second input to AND gate 166a is a logic "1", on account of the top input pin thereof being inverted. Second inputs to AND gates 166b-166y are inverse signals respectively on lines 165a-165x. Thus, an AND gate 166a-166y will output a logic "1" only if said first input is a logic "1" and said second input is a logic "0", a condition that can only occur at the first occurrence of a leading zero. Thus, no more than one AND gate 166a-166z can output a logic "1".

If the entire fraction is zero, then none of the OR gates 164a-164z will output a logic "1". In particular, the last OR gate 164z will transmit a logic "0" state to inverter 170 via line 171. A logic "1" output on line 172 thus signifies that all states on lines 91a-91z are zero.

Region 179 comprises OR gates and open collector inverters connected in a binary tree structure whose collective action is to encode the number of leading zeros, and is best described using a specific example. Suppose the five lines 91a-91e are all logic "0", line 94f is a logic "1", and the sign 143 is a logic "0". Thus, there are five leading zeros. Then line 165e will be a logic "0" and line 165f will be a logic "1". AND gate output line 167f will then be the only line of outputs 167a-167y to be a logic one. Line 167f is connected to OR gate 180, which accordingly outputs a logic "1" on line 182. Inverter 181 thus outputs a logic "0" and pulls line 183b down to a logic "0". The logic "1" state on line 182 also causes OR gate 183 to output a logic "1" on line 184. Line 184 is connected to OR gate 185, which will thereby output a logic "1" to inverter 186 via line 187. Inverter 186 outputs a logic "0" and pulls line 183d down to a logic "0". Lines 183a and 183c will be in a logic "1" state since they are respectively pulled up by resistors 192 and 193 to the supply voltage VCC. Inverters 196a-196d will invert signals on lines 183a-183d so that inverter outputs 197a-197d will respectively become a logic "0101" which is the binary representation for the decimal number "5" in this specific example where there are five leading zeros. Those skilled in the art should readily appreciate that the binary tree structure 179 can be extended to encode any finite number of leading zeros.

Figure 10:
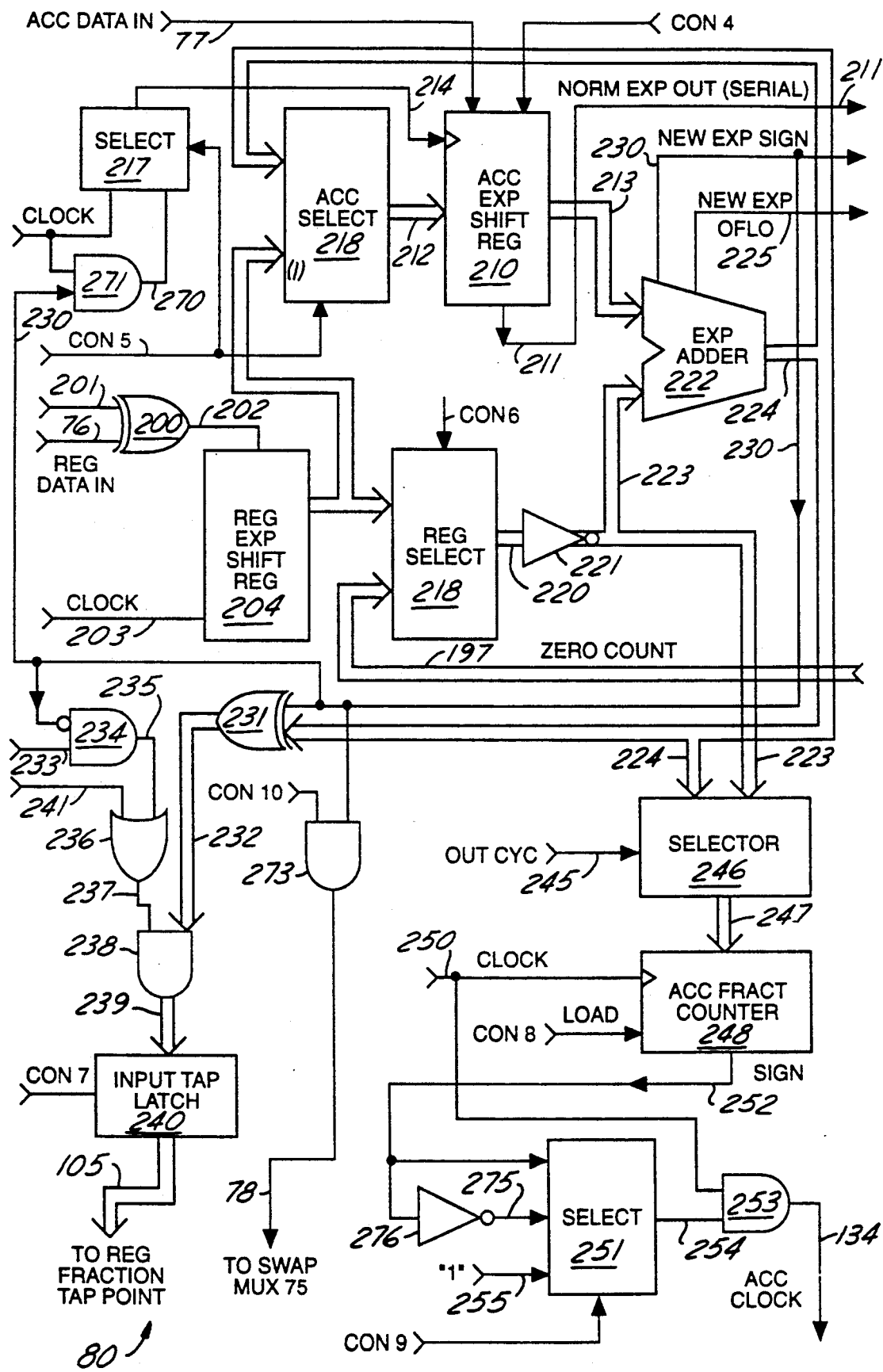
FIG. 10 is a detailed diagram of the normalization control.

NORMALIZATION CONTROL (FIG. 10). Referring to FIG. 10, a preferred embodiment for normalization control 80 is shown in detail, and comprises shift registers 204 and 210 to store the exponents for the register and accumulator, an adder to perform operations on exponents, and controls for handling normalization computations for both exponent and fraction parts of the floating point numbers. Normalization control 80 handles normalization or alignment of numbers for addition and for multiplication.

Exponent Computation for Multiplication Cycle. During a multiplication cycle, the floating point number to be input to the register fraction storage 83 will come first. The exponent part will be transmitted from memories 13a-13n via line 76 to exclusive OR gate 200. The control input on line 201 from controller 22 is a logic "1" during this period so that output line 202 will be logical inverse of the incoming exponent data. Controller 22 will transmit a clock signal via line 203 to the register exponent shift register 204 so that the incoming inverted register exponent data will be stored therein.

Accumulator exponent shift register 210 has a serial input from line 77, a serial output to line 211, a parallel input from lines 212, a parallel output to lines 213, and a clock input on line 214. During the period that the accumulator exponent is being transmitted from memories 13a-13n, via line 77, a signal from controller 22 via control line CON4 activates the serial input function of the accumulator exponent shift register 210. Controller 22 also transmits a logic zero to selector control line CON5 so that selector 217 will pass clock signals from controller 22 on line 215 to output 214. Thus, clock signals on line 214 will cause incoming register exponent data to shift register 210 on line 77 to be stored therein.

Register selector 218 is commanded by signals from control line CON6 to select and transmit data from the register exponent shift register parallel output lines 219 to output lines 220. The register data on lines 220 are inverted by several inverters collectively represented by inverter symbol 221, and transmitted to an input of exponent adder 222 via lines 223. Since the register exponent data in shift register 204 was previously inverted during input by exclusive OR gate 200, the action of inverters 221 is to restore the register exponent to its original noninverted form on adder input lines 223.

Exponent adder circuit 222 performs a parallel add of the register exponent data on lines 223 with the accumulator exponent data on lines 213, and transfers the resultant sum to lines 224. At the same time, the exponet adder 222 outputs a logic "1" on line 225 if the parallel add produced an overflow condition.

Accumulator selector 228 is commanded by a logic "0" signal from control line CON5 to select and transmit data from the adder output lines 224 to selector output lines 212. Controller 22 then commands via a mode command on control line CON4 that accumulator exponent shift register 210 store the contents of lines 212 therein during a clock cycle on line 215, via selector 217. It should be apparent that accumulator exponent shift register 210 now contains the accumulator exponent that had been stored therein added to the register exponent. The new value in register 210 is the new exponent that is appropriate for the multiplication of the two input floating point numbers.

At this point, controller 22 causes the multiplication of the two floating point fractions in the manner that was described in detail before. Then a count of the leading zeros in the fraction part will occur. The remaining steps to be described later are a renormalization of the new floating point word, a detection of exceptions, and a transmission of the new word back to memories 13a-13f.

Exponent Computation for Addition Cycle. During an addition cycle, the floating point number to be input to the accumulator is loaded first. As may be understood with reference to FIG. 10, the exponent part is transmitted from memories 13a-13n to serial input line 77 to accumulator exponent shift register 210 which is commanded by controller 22 via control line CON4 to clock said input serial data therein. Next, during the period that the register exponent is being transmitted from memories 13a–13n via line 76, control line 201 from controller 22 to exclusive OR gate 200 will be a logic "0" so that data on line 76 will be transferred unchanged to line 202, where it is serially clocked into register exponent shift register 204 while controller 22 transmits clock signals thereto via line 203.

Register selector 218 is commanded by signals from control line CON6 to select and transmit data from the register exponent shift register parallel output lines 219 to output lines 220. The register data on lines 220 are inverted by several inverters 221, and transmitted to an input of exponent adder 222 via lines 223.

Adder circuit 222 performs a parallel subtraction of the register exponent data on lines 220 from the accumulator exponent data on lines 213. The resultant difference is transmitted to lines 224.

There are two cases to be considered when two floating point numbers are to be aligned before addition of the fraction parts occur. If the accumulator exponent is larger than the register exponent, then the register fraction part must be down-shifted by an amount equal to the difference in exponents (Case 1), otherwise the accumulator fraction part must be shifted by that amount (Case 2). These two Cases were previously discussed in part with respect to FIGS. 3B and 3C respectively, and will now be discussed in greater detail.

(1) Addition Cycle, Case 1. If the accumulator exponent is greater than the register exponent, then the difference of exponents on lines 224 from adder 222 will be positive, and the sign bit 230 will be logic "0". The sign bit 230 along with the adder output lines 224 enter a number of exclusive OR gates represented by exclusive OR gate symbol 231, which pass the values on lines 224 to lines 232 unchanged since the sign bit is a logic "0". Controller 22 transmits a logic "1" to command line 233 which is received as input by AND gate 234. Since the sign bit 230 is inverted before entering AND gate 234, output 235 therefrom will be a logic "1". OR gate 236 receives a logic "1" from controller 22 via control line 241, and a logic "1" on line 235, and thus passes a logic "1" to line 237. Line 237 and lines 232 are input to a number of AND gates represented by AND gate symbol 238. AND gates 238 pass the values on lines 232 to lines 239 when line 237 is in a logic "1" state. Controller 22 enables tap point latch 240 to store the individual bits of data on parallel lines 239 therein by a command signal on command line CON7. Outputs from tap point latch 240 are on lines 105 and serve as the input to decoder 106 in FIG. 7.

From the foregoing, it should be apparent that the value of the signals encoded on lines 105 is the difference in exponents as are appropriate in Case 1 for aligning the register fraction part of the floating point number, so that when the register fraction is loaded into the register fraction circuit 83, as previously discussed, the register fraction part will be down-shifted, or aligned with respect to the accumulator fraction part so that addition of the fraction parts can properly occur.

As shown in FIG. 10, the difference in exponents on lines 224 is selected by selector 246, by a command from controller 22 via line 245. Output lines 247 of selector 246 allow this difference to be latched in parallel into counter 248 by a command from controller 22 via command line CON8. Then, during the loading of the register fraction part of the floating point number, controller 22 will clock counter 248 via line 250. Controller 22 will also command selector 251 via control line CON9 to pass sign output 252 from counter 248 to AND gate 253 via line 254. Since the sign bit is a logic "0" in this case, then AND gate 253 will output a logic "0" to line 134 which is the accumulator fraction shift register clock.

It should be apparent that the contents of accumulator shift register 131 will not be further clocked during the input of the register fraction in Case 1, since the value in counter 248 is positive, and will remain positive during the clocking period. Refer to FIG. 3B for a pictorial view.

(2) Addition Cycle, Case 2. If the accumulator exponent is smaller than the register exponent, then the difference of exponents in lines 224 from adder 222 will be negative, and the sign bit 230 will be logic "1". Since the sign bit 230 is inverted before entering AND gate 234, a logic "0"$\pi$will be output therefrom on line 235. Since control line 241 is also a logic "0", then OR gate 236 will output a logic "0" on line 237. Thus, all outputs 239 from AND gates 238 will be zero. Thus, when tap latch 240 is clocked by a signal from control line CON7, the contents therein will all be a logic zero.

It should thus be apparent that, in Case 2, during the loading of the register fraction part of the floating point number being input from memories 13a–13n, the tap point will be zero and there will be no down-shift as mentioned in the description of the register fraction circuit 83 in FIG. 3C.

Since the sign bit 230 in this case is a logic "1", then the number loaded into counter 248 is negative, and will transmit a logic "1" on line 252, which is the counter sign bit. Thus, selector 251 will transmit the logic "1" from line 252 to the output thereof on line 254. AND gate 253 will, in Case 2, pass clock signals to the accumulator fraction circuit 84 via line 134 until the contents of counter 248 become positive, and the sign change on line 252 blocks further click signals on line 134.

It should thus be apparent in Case 2 that during the loading of the register fraction part of the floating point number being input from memories 13a–13n, there will be a down-shift of the fraction part of the accumulator floating poin word previously stored in shift registers 131. The number of shifts will be equal to the difference in exponents and is appropriate for aligning the accumulator fraction with respect to the register fraction so that addition of the fraction parts can properly occur in this case. Refer to FIG. 3C for a pictorial view of Case 2.

(3) Addition Cycle, The New Exponent. In an addition operation, the new exponent will be the maximum of the register exponent and the accumulator exponent. Controller 22 will command selector 228 by transmitting a logic "1" on line CON5 to pass register exponent data from lines 219 to output lines 212. The logic "1" on line CON5 will also cause selector 217 to pass signals on input 270 to the clock input of accumulator exponent register 210 via line 214. Controller 22 will also put accumulator exponent register 210 in the parallel input mode by a command signal in line CON4, and will also transmit a single clock pulse on line 215.

If the accumulator exponent is larger than or equal to the register exponent, then the exponent sign bit on line 230 will be a logic "0" so that AND gate 271 which receives the sign bit signal will not pass the clock pulse on line 215 to the selector input on line 270. Accumulator exponent shift register 210 will not, therefore, receive any clock signal on line 214 and thus the contents therein will remain unchanged.

It is the accumulator exponent is smaller than the register exponent, then the exponent sign bit on line 230 will be a logic "1". So AND gate 271 will pass the clock pulse on line 215 through AND gate 271 and selector 217, and thence via clock input line 214 to accumulator exponent shift register 210. In response, register 210 will store the register exponent shift register data on lines 212 therein.

It should thus be apparent that the accumulator exponent shift register 210 by the aforementioned means now contains the larger value of the accumulator exponent and the register exponent and that this value is the proper exponent value for the floating point addition operation to be performed.

The next step at this point is that controller 22 causes the addition of the two floating point fractions using adder 88 shown in FIG. 2. Then a count of the leading zeros in the fraction part is performed. The next steps to be performed thereafter are a renormalization of the new floating point word, a detection of exceptions, and a transmission of the new word back to memories 13a-13n. These three final steps will be described later.

Addition Cycle for Simultaneous Inputs. If floating point addition is being performed on two separate columns from memories 13a-13n, then a speed advantage could be gained if both the accumulator and the register could be loaded simultaneously. However, normalization of exponents and fractions for addition cannot occur as before since the aforementioned addition normalization method requires the accumulator fraction to be in place before the register fraction is read in. Operations where simultaneous memory inputs are useful include, for example, addition of a row of numbers. In this case, selected alternate ones of the processing cells 11a-11n will receive data from memories associated with non-selected adjacent cells and their own associated memories, while the non-selected adjacent cells receive no input data and are inoperative. After additions is performed, alternate cells will now contain the sums of two adjacent cells. Next, every fourth processor will simultaneously receive data from the previously selected alternate pairs of cells so that said fourth processor cells will effectively compute the sum of four consecutive adjacent cells. The above process is repeated with every eight cell and so forth, so that for a row with $2^n$ cells, only n operations are needed to sum the contents of the entire row.

Exponent Input. For the Case of simultaneous inputs, controller 22 transmits a logic "0", via line CON10, shown in FIG. 10, to AND gate 273, so that its output, on line 78 is a logic "0". Swap mux 75 (FIG. 2) is thus commanded by line 78 to transfer register exponent data from line 15i to line 76, and to transfer accumulator exponent data from line 72 to line 77. Thus, register exponent data will be input from the memory 13a -13n associated with the processor unit, and accumulator data will be input from some more distant memory via input lines 15i or 15j, selected by selector 71.

Referring again to FIG. 10, exponent data will enter accumulator exponent shift register 210 and register exponent shift register 204 and be subtracted as before so that the difference, that is the accumulator exponent minus the register exponent, will be on lines 224 and the sign will be on line 230. Neither accumulator nor register fraction parts will have been input yet.

Alignment of Fraction Parts. Next, controller 22 will transmit a logic "1" to control line 241 so that OR gate 236 will pass a logic "1" to AND gates 238 via line 237.

The exclusive OR gates 231 pass the absolute value of the difference of accumulator and register exponents to lines 232 since a negative sign bit (logic "1") will cause an inversion of the input difference. Controller 22 then transmits a signal via control line CON7 to cause tap latch 140 to store the absolute value of the difference of exponents therein. Thus, when fraction data is input to register fraction circuit 83, the input tap will be operative as discussed before.

Via control signal CON9, controller 22 also commands selector 251 to pass a logic "1" on line 255 to output 254 thereof so that AND gate 253 will allow clock signals on line 250 to pass to accumulator fraction circuit 84. Note that in this case, counter 248 will have no influence on the clock signal on line 134.

Controller 22 also transmits a logic "1" to AND gate 273 via control line CON10. Thus, the signal transmitted to swap mux 75 via line 78 will be the same as the exponent sign bit on line 230.

Loading Fraction Parts. Next, both fraction parts, one for accumulator fraction circuit 84, and one for the register fraction circuit 83, will be simultaneously loaded. There are two cases depending on the sign of the difference of exponents.

(1) Addition Cycle, Case 1. If the accumulator exponent is greater than the register exponent, then the sign bit on line 230 will be a logic "0", and thus swap mux control line 78 will remain at a logic "0", as it was during the loading of the exponent parts. The fraction part input to the register fraction circuit 83 will be down-shifted by an amount equal to the tap point, and data to the accumulator fraction circuit will not be down-shifted. This is proper since the register exponent is smaller.

(2) Addition Cycle, Case 2. It the accumulator exponent is smaller than the register exponent, then the sign bit on line 230 will be a logic "1", and thus swap mux control line 78 will switch to a logic "1". It is now opposite to what it was during the loading of the exponent parts. Crossbar switch 75 will interchange data on lines 76 and 77 so that the fraction part input that was destined for the accumulator fraction circuit 84 will be transferred instead to the register fraction circuit and be down-shifted by an amount equal to the tap point, and fraction part input that was destined t the register fraction circuit will be transferred instead to the accumulator fraction circuit and will not be down-shifted. This method allows correct normalization of the fraction parts, and takes advantage of the input tap circuit in the register fraction circuit 83 without having to provide a duplicate tap input circuit in the accumulator fraction Controller 22 next loads the maximum value of the two exponents into accumulator exponent shift register 210 as was described earlier.

The Output Cycle. The final step after the computation of the new exponent and fraction parts of a floating point number as the result of an addition or multiplication operation is a re-normalization to remove leading zeros and adjus the exponent accordingly, and then serially shift out the final result.

(1) Exponent Output. The exponent is adjusted by subtracting the number of leading zeros. The leading zeros count circuit 87 was described earlier with respect to FIGS. 2 and 9, and the output therefrom is on lines 197. Controller 22 commands selector 218 (FIG. 10), via control line CON6, to transmit the value of the leading zeros count on lines 197 to output 220. The value thereof is negated by inverters 221 and transmitted to adder 222. Output 224 of adder 222 is thus now a value equal to the new exponent minus the leading zeros count, which value will hereafter be called the normalized exponent. Controller 22 sets control line CON5 to a logic "0" so that the normalized exponent value is transmitted through selector 228 to the accumulator exponent shift register 210, and is clocked therein. The normalized exponent therein is then clocked out via serial line 211, by appropriate clock and control signals arranged by controller 22 and respectively placed on lines 214 and CON4. Line 211 connects to exception handler 86 which may make further changes to the normalized exponent under certain conditions to be described later.

(2) Fraction Output. Normalization control 80 controls the clocking of the new fraction part of the floating point number via the accumulator clock signal on line 134 (FIGS. 2 and 10) in the following manner. First controller 22 commands, via control line 245, selector 246 to pass the negative or inverted value of the leading zeros count, which is on lines 223, to output lines 247, leading to counter 248, where the value is loaded therein via a command on control line CON8. If there are a few leading zeros, the counter sign bit will be negative. Selector 251 is then commanded by controller 22 via control line CON9 to pass the signal on line 275 to AND gate 253 via output line 254. Thus, due to inverter 276, the signal on line 254 is the complement of the counter sign bit 252. Since the sign bits is negative, or a logic "1", the inverted signal on line 254 will be a logic "0", and AND gate 253 will block clock signals on line 250 from being transmitted to the accumulator clock line 134.

Finally, controller 22 sets memories 13a–13n in the column enable mode and transmits memory write signals via line 30 (FIG. 2), as previously described, and clocks the fraction part of the new floating point number out to memories 13a–13n while sending consecutive row memory addresses via lines 23. However, the fraction part may be altered by exception handler 86 (FIG. 2) before being transferred to memory. Controller 22 also synchronously clocks the accumulator fraction shift register 131 (FIG. 8) via clock signals on line 134 thereby transmitting data therein to memory via serial output line 133, with the least significant bit being shifted out first.

However, since clock signals on line 134 are blocked by AND gate 253 due to a logic "0" on line 254, register 131 will not shift, and only the least significant bit will be clocked to consecutive memory locations until counter 248 counts up to a positive value. Then the remaining bits in counter 131 will be clocked for the remaining duration of the clocking of the fraction part. Since counter 248 starts out with the negative value of the leading zero count, the number of clock pulses delayed by AND gate 253 will be equal to the number of leading zeros. A pictorial view of the delayed output of the accumulator fraction is shown in FIG. 6C.

From the foregoing, it should be apparent that, due to the delay in receiving accumulator clock signals on line 134, data from the accumulator fraction shift register serial output port 133 (FIG. 8) will effectively be shifted from the original position so that all data will be sent out except for the leading zeros. This action is equivalent to a normalization of the fraction part of the new floating point number to be output.

EXCEPTION DETECTOR (FIGS. 2 and 11). Both the exponent part and the fraction part of the new floating point number must be modified before being output to memories 13a–13n if the operation caused an exception condition. There are three exception conditions covered in the present invention: infinity, zero, and not-a-number (NAN). Exceptions are preferably encoded according to IEEE Standard No. 754 as follows: infinity has an exponent of all logic "1"s and a zero fraction; NAN has an exponent all logic "1"s and a nonzero fraction; and zero has both a zero exponent and a zero fraction. Exceptions can be generated under two circumstances: when an input number is already an exception, or when an exception is generated during the current operation or cycle.

Referring to FIG. 11, a preferred embodiment for exception detector 85 is shown in detail and will not be discussed. The unit of exception detection of conditions in the accumulator is shown within the dotted line block 280. Block 280 operates as follows. First, flip-flops 281, 282, 283 and 279 are cleared by controller 22 via a clear signal on control line CON19, and then during the inputting of the accumulator into storage fraction, the signal therefrom on line 77 is transmitted to an input of OR gate 284. A second input to OR gate 284 is from the output 285 of flip-flop 281. Flip-flop 281 is clocked via a clock signal on control line CON11 in synchrony with data coming in on line 76. If all incoming serial bits on line 77 are a logic "0", then output line 285 from OR gate 284 will remain at a logic "0". Any logic "1" signal or bit on line 77 will cause a logic "1" to pass through OR gate 284, to be latched by flip-flop 281, to appear on output line 285, and to again pass through OR gate 284. Lines 285 and 286 will remain at a logic "1" until the flip-flop is cleared again by controller 22. Thus, if the accumulator fraction is zero, line 285 will be a logic "0", and the output 291 of inverter 287 will be a logic "1" and represent the condition that the accumulator fraction is zero.

Flip-flops 282 and 283 operate in the same manner except that they are clocked by control line CON12 during the inputting of the exponent part of a floating point number to the accumulator. Thus, the output 292 from inverter 288 will be logic "1" if the accumulator exponent is zero. The output 293 from inverter 289 will be a logic "1" if the accumulator exponent bits are all logic "1" since the exponent data is A first exception condition (ACC INF) where the number being input to the accumulator is infinity is decoded by AND gate 294, upon its inputs 291 and 293 revealing the fraction part is zero and the exponent part is all ones. A second exception condition (ACC ZERO) where the number to the accumulator is zero is decoded by AND gate 295 if the inputs 291 and 292 reveal the fraction part is zero and the exponent part is zero. A third exception condition (ACC NAN) where the number to the accumulator is NAN is decoded by AND gate 296 if inputs 291 and 293 reveal the fraction part is not zero and the exponent part is all ones. These three exception conditions are respectively output on lines 297, 298 and 299.

Control line CON13 will clock only during the inputting of the sign bit of the accumulator number, so that output (ACC SIGN) from flip-flop 297 on line 301 will represent the sign bit of the accumulator number.

Exceptions on line 76, which is the register data input line, are detected by a circuit 300 which is identical to that for the accumulator exception detector. Control inputs to the register exception detector are provided on lines CON14, CON15 and CON16 which are clocked respectively during the fraction part exponent part, and sign part of the serial inputting of the register floating point number in the processor cell 11i. All flip-flops in circuit 300 are also cleared during a clear signal on control line CON19. Outputs from circuit 300 involve four register exceptions and are implemented similarly to corresponding similarly needed exceptions for the accumulator number mentioned above. Thus, on lines 302 through 304 detection of the following three exceptions are output: register infinity (REG. INF), register zero (REG. ZERO) and register NAN (REG. NAN). Also, the sign bit of incoming register number is output on line 305 as REG. SIGN.

After the floating point operation, exponent adder 222 shown in FIG. 10 outputs a new exponent overflow condition, if one exists, as a logic "1" on line 225, and a new exponent sign bit on line 230. A new exponent infinity condition NEW EXP.INF is detected by AND gate 306 and output on line 310 if a new exponent overflow condition results, and the new exponent sign on line 230 is positive (logic "0"). If a new exponent overflow condition results (logic "1" on line 225), and the new exponent sign is negative (logic "1" on line 230), a new exponent zero condition is detected by AND gate 307, and is output on line 308, to OR gate 309 where it is output on line 311 as a logic "1". A zero fraction part also represents an exception condition as previously explained, and is detected when the fraction part has all leading zeros as encoded by a logic "1" on line 172 (from FIG. 9). In that case, OR gate 309 will also output a logic "1" on line 311 indicating the new exponent zero condition.

Figure 12:
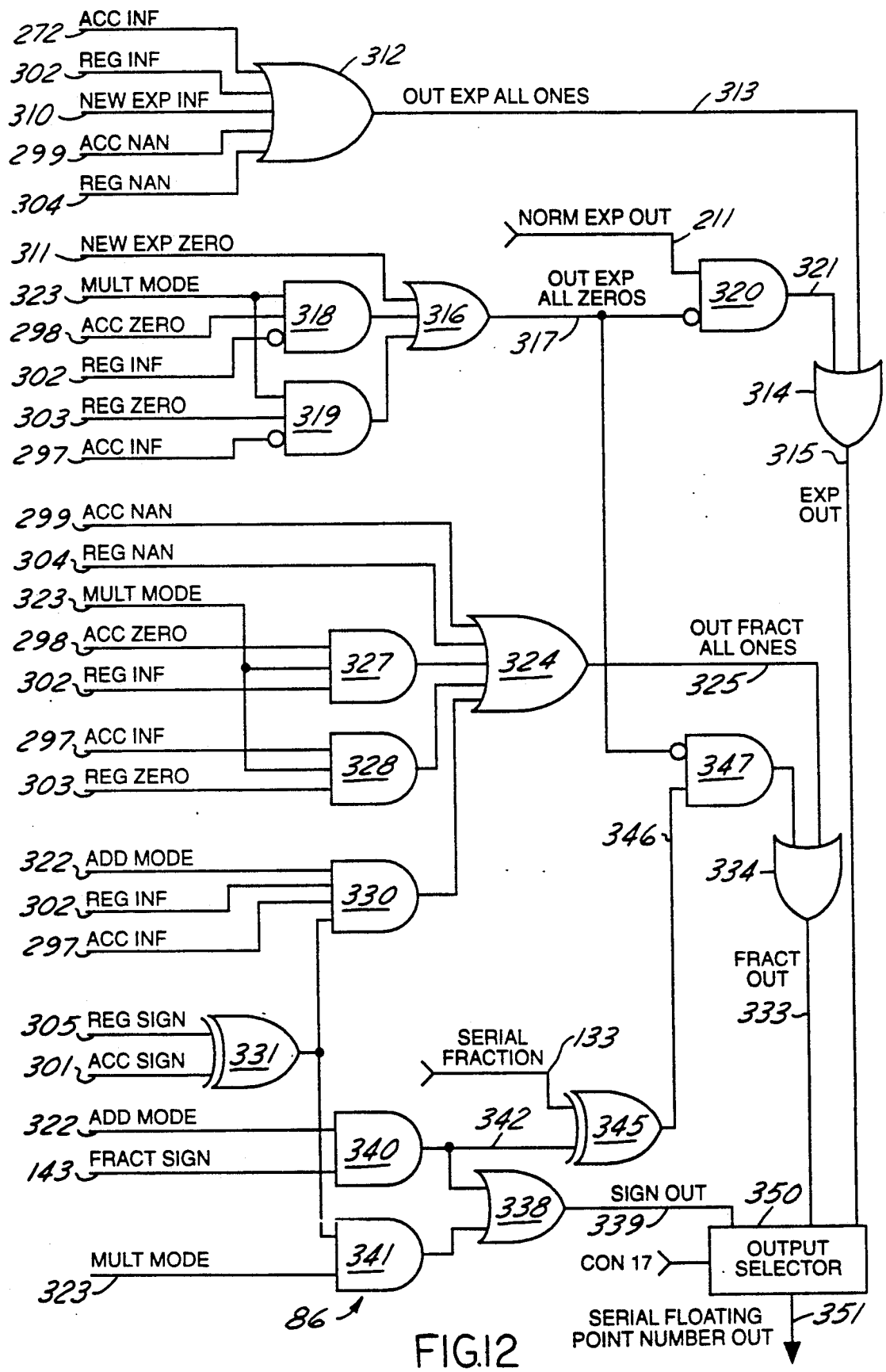
FIG. 12 is a circuit for handling exceptions.

EXCEPTION HANDLER (FIG. 12). FIG. 12 shows details of a preferred embodiment of the exception handler 86 where the various exception conditions are encoded, if they exist, into a serial output bit stream on line 351. If no exceptions exist, the newly computed floating point number is output as computed. In the exception handler 86, the ADD MODE line 322 and MULT MODE line 323 are control signals from controller 22, and are respectively a logic "1" during an addition operation and a multiplication operation.

Exponent Output. For infinity or NAN conditions, the exponent must be all ones. If an accumulator infinity, register infinity, new exponent infinity, accumulator NAN, or register NAN condition exists, OR gate 312 outputs a logic "1" on line 313. Then, OR gate 314 outputs a logic "1" to exponent output line 315.

A zero exponent occurs under three conditions which are detected by OR gate 316, and are output on line 317. These zero exponent conditions occur if: (1) the new exponent is zero; (2) during the multiply mode, the accumulator number is zero and the register number is not infinite, as detected by AND gate 318, or (3) during the multiply mode, the register number is zero and the accumulator is not infinite. As previously described, conditions (2) and (3) occur when multiplying a zero number by a finite number.

If the output exponent is zero, line 317 will be a logic "1". This causes AND gate 320 to output on line 321 a logic "0". Since line 313 will be zero under these conditions, both inputs to OR gate 314 are at logic "0", and thus exponent output line 315 will be a logic "0".

If there are no exceptions, AND gate 320 will pass the serial exponent stream on line 211, which originates from the accumulator exponent shift register 210 in normalization control circuit 80 (FIG. 10), to output line 321. This stream then passes through OR gate 314 to exponent output line 315.

Fraction Output. The only circumstance where all fraction output bits will be forced to a logic "1" is when the output is NAN, which occurs under five conditions that are detected by OR gate 324, where output is line 235. These NAN conditions occur: (1) if the accumulator number is NAN; (2) if the register number is NAN; (3) if in the multiplication mode, as detected by AND gate 327, the accumulator number is zero and the register number is infinite; (4) if in the multiplication mode, as detected by AND gate 328, the accumulator number is infinite and the register number is zero, (5) if, in the add mode, as detected by AND gate 330 and exclusive OR gate 331, the register number is infinite, the accumulator number is infinite, and the two signs are different. As previously described, conditions (1) and (2) occur when operating with a NAN, conditions (3) and (4) occur when multiplying zero by infinity, and condition (5) occurs when adding plus infinity to minus infinity. In summary, line 325 will be a logic "1" if the fraction bits are all to be ones. Thus, fraction output line 333 will be a logic "1" by action of OR gate 334.

Sign Bit. There are two operation modes, detected by OR gate 338, which determine the sign bit provided on line 339. These modes are (1) in the add mode the fraction sign bit on line 143 from fraction adder 88 (FIG. 2) is passed by AND gate 340; or, (2) in the multiply mode the sign is the exclusive OR of the two input sign bits, as passed by exclusive OR 331 and AND gate 341. Mode 1 occurs because addition involves signed numbers, and mode 2 occurs because multiplication involves unsigned numbers, and the new sign must be generated from the input sign bits.

The sign bit in the add mode is on line 342. The serial fraction output stream is transmitted on line 133 from accumulator fraction circuit 84 (see FIGS. 2 and 8), and is input to exclusive OR gate 345 which will change signed numbers from addition operations to unsigned numbers at output 346 therefrom. If there are no exception conditions, then line 317 will be a logic "0" and AND gate 347 will accordingly pass the unsigned fraction bit stream via line 348 to OR gate 334, and thence to fraction output line 333.

Final Output. During the clocking of the newly produced floating point number out to memories 13a-13n, output selector 350 will be commanded by controller 22 via control line CON17 to select the sign bit on line 339, the exponent bit stream on line 315, and the fraction bit stream on line 333 at the appropriate times, and pass the selected bit signals therein to output line 351. Control line CON18 in FIG. 2 will then enable three-state buffer 351 to transfer the output data from line 351 to line 15i so that the data can be written to memory 13i.

EPILOGUE. From the foregoing, it can be appreciated that the system and method of my invention, which employs a linear chain of selectively interconnectable parallel processing units described herein, not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the present contribution to the art. For example, although various hard-wired logic circuits involving specific combinations of AND, OR, exclusive OR and inverter gates, and/or shift registers and selection devices responsive to specified patterns of control and clock signals is disclosed, any number of other hardware designs may be utilized. Also, the logic circuits disclosed herein may, upon further reduced in complexity or re-arranged using any one of several well-known logic design simplification techniques or programs, and such changes are deemed to be within the scope of the broader aspects of this invention.

Also, the present invention may be used in a number of different ways within another computer system, for example, as a co-processor dedicated to floating point computations. The present invention may also be used as a dedicated processor to perform preliminary analysis or transformations upon data as such data is received or generated by a high-speed signal-processing system.

Also, the correlative terms "row" and "column", "vertical" and "horizontal," "left" and "right", "east" and "west," "up" and "down," and the like are used herein to make the description and claims more readily understandable and are not meant to limit the scope of the invention. In this regard, those skilled in the art will readily appreciate such terms are often merely a matter of perspective and are interchangeable merely by altering one's perspective, e.g., rows become columns and vice-versa when one's view is rotated 90 degrees.

Also, although the architecture of the preferred embodiments disclosed herein is based primarily upon floating point data words having sixty-four bits, and processing data in rows having n columns, it should be appreciated that my invention described herein can be readily adapted to data words of other sizes, such as from data words as small as 12 bits to data words as large as 96 (or more) bits, and process data in groups of correspondingly smaller or larger arrays. In this regard, those skilled in the art will appreciate that the preferred system and methods of the present invention disclosed herein may be readily adapted and/or modified to conform with floating point data and processing standards as set forth in IEEE standard No. 754, or as promulgated by leading computer system manufacturers such as IBM or DEC. Accordingly, it is to be understood that the protection sought and to be afforded hereby should be deemed to extend to the subject matter claimed and all equivalents thereof fairly within the scope of the following claims.

I claim:

1. A parallel processing system for performing floating point operations upon a matrix of data representing floating point numbers and having at least m rows and n columns, where m is an integer equal to or greater than one and n is an integer greater than four, comprising:

a chain of n identical individual processing units which are linked together by a plurality of connections such that adjacent units in the chain are coupled to one another, with each of the individual processor units including a processor cell for performing floating point addition and multiplication operations using bit serial techniques, local memory means having multiple memory locations for storing at least part of a respective one of the n columns of data, and a bidirectional communications channel between the processor cell and the local memory means;

controller means for providing a single set of identical instructions to all n processing units simultaneously;

row addressing means for providing an identical row address to each of the n local memory means;

selection means for specifying which ones of the n local memory means are to be enabled;

means for transferring data representing a floating point number serially between a selected individual memory location within any one of the local memory means and a host data transfer device; and shift register means for transferring data representing at least part of a floating point number in parallel between the chain of processing units and the host device.

2. A system as in claim 1, wherein each floating point processor cell includes:

means for temporarily storing a plurality of floating point numbers with each such number split into at least an exponent part and a fraction part;

means for normalizing at least one of the floating point numbers as said floating point number is being stored;

means for handling a plurality of special cases resulting from floating point number computations, with the plurality of cases being taken from the group of special cases consisting of overflows, underflows, infinite numbers, zero and undetermined results; and means for adding a plurality of temporarily stored fraction parts.

3. A system as in claim 2, wherein each processor cell includes: means for adding a plurality of temporarily stored exponent parts; and means for multiplying at least one temporarily stored fraction part of a first floating point number by the fraction part of a second floating point number as such fraction part is being received in serial fashion by the processor cell.

4. A system as in claim 3, wherein in each processor cell further includes means for counting the leading zeros of the fractional part of at least one of the floating point numbers.

5. A system as in claim 4, wherein in each processor cell the means for temporarily storing includes register storage means for holding a first floating number provided with first and second shift register means for respectively holding the exponent part and the fraction part of the first floating point number, and an accumulator storage means for holding a second floating point number provided with third and fourth shift register means for respectively holding the exponent part and the fraction part of the second floating point number, and each processor cell further includes:

first and second serial communication pathways, with the first such pathway being normally dedicated to transmitting a first floating point number to the register storage means and the second such pathway being normally dedicated to transmitting a second floating point number to the accumulator storage means; and means for selectively interchanging at least the fraction parts of the first and second floating point numbers so that the fraction part of the first number is passed along at least part of the second pathway to the accumulator storage means, and so that the fraction part of the second number is passed along at least part of the first pathway to the register storage means.

6. A method of performing floating point computations at a high rate of speed using bit serial techniques, comprising the steps of:
   (a) providing a interconnected array of processing units each of which includes a floating point processor cell;
   (b) serially transferring floating point data into each floating point processor cell and simultaneously performing at least a portion of a cycle of a bit serial, floating point operation in at least two of the floating point processor cells;
   (c) arranging the array of processing units in a linear chain at least 16 processing units long; and
   (d) providing a controller connected to each of the units for providing memory addresses and memory control signals and instructions to the units;
   wherein the first cycle of bit serial floating point operations includes adding a first and a second floating point number, and includes the steps of:
      (1) splitting a first serial stream of data representing the first floating point number into a first exponent part and a first fraction part;
      (2) temporarily storing the first exponent part into a first exponent storage means;
      (3) splitting a second serial stream of data representing the second floating point number into a second exponent part and a second fraction part;
      (4) computing the difference between the first and second exponents;
      (5) temporarily storing the first fraction part into a first fraction storage means;
      (6) temporarily storing the second fraction part into a second fraction storage means; and
      (7) simultaneously with one of substeps (5) and (6) adjusting the manner in which one of the first and second fraction parts are temporarily stored, with the fraction part which is adjusted being determined at least in part by the result of the computation performed in substep (4).

7. A method of performing floating point computations at a high rate of speed using bit serial techniques, comprising the steps of:
   (a) providing a interconnected array of processing units each of which includes a floating point processor cell;
   (b) serially transferring floating point data into each floating point processor cell and simultaneously performing at least a portion of a cycle of a bit serial, floating point operation in at least two of the floating point processor cells;
   wherein the cycle of bit serial floating point operation includes adding a first and second floating point number from different processing units, and the method further includes the steps of:
   (c) within each processor cell providing a register storage means and an accumulator storage means; and
   (d) within each processing unit providing local memory means for holding at least one floating number which is serially connected to the processor cell of the processing unit and to at least one other processing unit, and wherein step (b) includes the following substeps:
      (1) simultaneously receiving in each processor cell performing such operation first and second bit serial streams of data representing the first and second floating point numbers respectively, with each such bit serial stream having an exponent part and a fraction part, and each serial bit stream originating from a different local memory means;
      (2) comparing the exponent part of the first floating point number with the exponent part of the second floating point number;
      (3) temporarily storing the fraction part in one of two fraction part storage means within the processor cell;
      (4) temporarily storing the second fraction part in the other of the two fraction part storage means;
      (5) selecting which of the two fraction part storage means the fraction part of each bit stream should be directed to, in accordance with the result of the comparison performed in substep (2); and
      (6) aligning fraction parts in accordance with the result of the comparison performed in substep (2).

8. A method as in claim 7, wherein substep (5) includes interchanging at least portions of first and second serial communications pathways by operating a swap multiplexing means.

9. A method of performing floating point computations at a high rate of speed using bit serial techniques, comprising the steps of:
   (a) providing a interconnected array of processing units each of which includes a floating point processor cell;
   (b) serially transferring floating point data into each floating point processor cell and simultaneously performing at least a portion of a cycle of a bit serial, floating point operation in at least two of the floating point processor cells;
   wherein the cycle of bit serial floating point operations includes multiplying a first and a second floating point number as multiplicand and multiplier respectively, and wherein step (b) includes the substeps of:
      (1) receiving first and second serial streams of data representing the multiplicand and multiplier respectively; and
      (2) multiplying fraction parts of the multiplicand and multiplier together using a shift-and-add technique;
      (3) loading the fraction part of the multiplicand into a register fraction shift register means;
      (4) zeroing out an accumulator fraction shift register means;
      (5) successively examining the state of each bit of the fraction part of the multiplier;
      (6) operating the accumulator fraction shift register means in one of two ways depending upon the state of the bit just examined, namely, if the examined bit is in its "0" state, serially shifting the contents of the accumulator fraction shift register means by one bit in a first direction, and if the examined bit is in its "1" state, adding the contents of the register fraction shift register means to the current contents of the accumulator shift register means and placing the resultant sum into the accumulator shift register means and shifting the resultant sum by one bit in the first direction; and
      (7) repeating substep (6) for each successive bit of the fraction part of the multiplier examiner in substep (5).

10. A method as in claim 9, wherein step (b) also includes the substeps of:

(8) normalizing a fraction product resulting from substep (2), and (9) serially transferring at least the resulting fraction product out of the processor cell to a local memory means connected with the processor cell.

11. A method of performing floating point computations at a high rate of speed using bit serial techniques, comprising the steps of:

(a) providing a interconnected array of processing units each of which includes a floating point processor cell;

(b) serially transferring floating point data into each floating point processor cell and simultaneously performing at least a portion of a cycle of a bit serial, floating point operation in at least two of the floating point processor cells;

wherein the first cycle of bit serial floating point operations includes multiplying a first and second floating point number as multiplicand and multiplier respectively, and wherein (b) includes the substeps of:

(1) splitting a first serial stream of data representing the multiplicand into a first exponent part and a first fraction part;

(2) splitting a second serial stream of data representing the multiplier into a second exponent part and a second fraction part;

(3) temporarily storing the first exponent part into a register exponent storage means;

(4) temporarily storing the first fraction part into a register fraction storage means;

(5) temporarily storing the second exponent part into an accumulator exponent storage means;

(6) zeroing out a second fraction part storage means;

(7) multiplying the first and second fraction parts together using a shift-and-add technique; and (8) temporarily storing the fraction product resulting from substep (7) in the accumulator fraction storage means.

12. A method of performing floating point computations at a high rate of speed using bit serial techniques, comprising the steps of;

(a) providing a interconnected array of processing units each of which includes a floating point processor cell;

(b) serially transferring floating point data into each floating point processor cell and simultaneously performing at least a portion of a cycle of a bit serial, floating point operation in at least two of the floating point processor cells;

wherein the cycle of bit serial floating point operation includes outputting the floating point number computed by each processor cell, and wherein step (b) includes the substeps of:

(1) examining the floating point number currently being computed for a plurality of exception condition selected from the group consisting of overflows, underflows, infinite numbers, zero and undetermined results; and (2) when one of the plurality of exception conditions are found, encoding the floating point number output from the processor cell with a predetermined code indicating the general type of exception condition if any which was found by the examination of substep (1).

13. A method as in claim 12, wherein substep (1) of step (b) includes the further substeps of:

(3) examining data representing a first floating point number to be used in the computation and being sent to an accumulator storage means to determine if the bits in the fraction part thereof or the exponent part thereof are all zeros or are all ones;

(4) examining data representing a second floating point number to be used in the computation and being sent to a register storage means to determine if the bits in the fraction part thereof or the exponent part thereof are all zeros or are all ones; and (5) examining data representing an exponent part resulting from the computation performed using the first and second floating point numbers to determine if an overflow condition is present, or if the value of the resulting exponent part is zero.

14. A method of performing floating point computations at a high rate of speed using bit serial techniques, comprising the steps of:

(a) providing a interconnected array of processing units each of which includes a floating point processor cell;

(b) serially transferring floating point data into each floating point processor cell and simultaneously performing at least a portion of a cycle of a bit serial, floating point operation in at least two of the floating point processor cells;

wherein step (b) includes the output substeps of:

(1) counting the number of leading zeros at the most significant end of a fraction part of at least one floating point number;

(2) eliminating the leading zeros of such fraction part by altering the clocking of the one floating point number while the fraction part thereof is being shifted out; and (3) adjusting an exponent part of the same floating point number in accordance with the number of leading zeros counted.

15. A method as in claim 14, wherein substep (2) of step (b) is performed at least in part by providing a shift register means for storing the fraction part of the one floating point number, providing a programmable tap point circuit which effectively determines at what stage data will enter into the shift register means, and programming the tap point circuit based upon the difference, if any, in the values of the exponents of the two floating point numbers to be added.

16. A method of performing floating point computations at a high rate of speed using bit serial techniques, comprising the steps of:

(a) providing a interconnected array of processing units each of which includes a floating point processor cell;

(b) serially transferring floating point data into each floating point processor cell and simultaneously performing at least a portion of a cycle of a bit serial, floating point operation in at least two of the floating point processor cells;

(c) providing an array of memory means for local storage of data representing floating point numbers at the array of processing units, with each such local memory means being associated with a distinct one of the processing units;

(d) providing input/output (I/O) means for transferring data between a host computer and the interconnected array of processing units;

(e) providing a controller connected to each one of the processor cells and to the local memory means;

(f) using the for controller enabling selected ones of the local memory means to transfer data via the I/O means between the host computer.

17. A method of performing floating point computations on a large array or matrix of data representing floating point numbers and having at least m rows and n columns, where m is an integer equal to or greater than one and n is an integer greater than 7, comprising the steps of:

(a) providing a linear chain of n identical individual processing units linked together by a plurality of connections such that adjacent units in the chain are coupled to one another, with each of the individual units including a processor cell for performing floating point addition and multiplication operations, local memory means for storing a respective one of the n columns of data, and a serial communications channel between the processor cell and the local memory;

(b) providing controller means for providing identical instructions to all n processor cells simultaneously and for providing address signals and memory enable signals to the n local memory means;

(c) storing each one of the n columns of data in a respectively associated local memory means;

(d) via the controller means, commanding all n processor cells to perform simultaneously a bit serial addition of two floating numbers obtained from their respective local memory means;

(e) via the controller means, commanding all n processor cells to transfer to their respective local memory means for storage therein the sums generated during step (d) and serially transferring via said serial communications channel said sums generated during step (d) from each of said n processor cells to their respective local memory means for storage therein the sums generated during step (d);

(f) via the controller means, commanding all n processor cells to perform a bit serial multiplication of two floating point numbers obtained from their respective local memory means; and (g) via the controller means, commanding all n processor cells to transfer to their respective local memory means for storage therein the products generated during step (f) and serially transferring via said serial communications channel said products generated during step (f) from each of said n processor cells to their respective local memory means for storage therein the products generated during step (f).

18. A method as in claim 17, wherein step (d) in each of the processor cells is performed at least in part by:

(1) receiving first and second serial streams of data representing the first and second floating point numbers to be added;

(2) comparing an exponent part of the first floating point number with an exponent part of the second floating point number;

(3) temporarily storing a fraction part of the first floating point number in a first fraction storage means;

(4) temporarily storing a fraction part of the second floating point number in a second fraction storage means;

(5) simultaneously with one of substeps (3) and (4) adjusting the manner in which one of the fraction parts are temporarily stored, with such one fraction part being determined at least in part by the result of the comparison performed in substep (2); and (6) adding the two temporarily stored fraction parts together.

19. A method as in claim 17, wherein step (e) in each of the processor cells is performed at least in part by:

(1) receiving first and second serial streams of data respectively representing the first and second floating point numbers to be multiplied, which numbers respectively constitute a multiplicand and a multiplier;

(2) multiplying the multiplicand and the multiplier together using a shift-and-add technique by loading a fraction part of the multiplicand into a register fraction shift register means, zeroing out an accumulator fraction shift register means, successively examining the state of each bit of a fraction part of the multiplier as such bit is being transferred into the processor cell, and repeatedly operating the accumulator fraction shift register means in one of two ways, with the particular way chosen for each such operation depending upon the state of the bits just examined.

* * * * *